United States Patent [19]

Takada

[11] Patent Number: 4,521,034
[45] Date of Patent: Jun. 4, 1985

[54] LOCKABLE MOVING BELT ANCHOR FOR PASSIVE VEHICLE OCCUPANT RESTRAINT BELT SYSTEMS

[75] Inventor: Juichiro Takada, Tokyo, Japan
[73] Assignee: Takata Corporation, Tokyo, Japan
[21] Appl. No.: 359,116
[22] Filed: Mar. 17, 1982

Related U.S. Application Data

[62] Division of Ser. No. 44,196, May 31, 1979.

[30] Foreign Application Priority Data

| Jun. 8, 1978 | [JP] | Japan | 53-077236 |
| Jun. 8, 1978 | [JP] | Japan | 53-068348 |
| Jun. 9, 1978 | [JP] | Japan | 53-068758 |
| Jun. 15, 1978 | [JP] | Japan | 53-081113 |
| Jun. 29, 1978 | [JP] | Japan | 53-078097 |
| Feb. 21, 1979 | [JP] | Japan | 54-018500 |
| Feb. 28, 1979 | [JP] | Japan | 54-021883 |
| Feb. 28, 1979 | [JP] | Japan | 54-024068 |
| Mar. 8, 1979 | [JP] | Japan | 54-030229 |
| Mar. 26, 1979 | [JP] | Japan | 54-034247 |

[51] Int. Cl.³ .......................................... B60R 21/10
[52] U.S. Cl. ................................................ 280/804
[58] Field of Search ............... 280/804, 802, 808, 806

[56] References Cited

U.S. PATENT DOCUMENTS

| 4,061,365 | 12/1977 | Nagano et al. | 280/804 |
| 4,159,848 | 7/1979 | Manz et al. | 280/804 |
| 4,225,155 | 9/1980 | Seiffert et al. | 280/804 |

Primary Examiner—Robert R. Song
Attorney, Agent, or Firm—Robert Scobey

[57] ABSTRACT

A passive vehicle occupant restraint belt system comprises a movable anchor which is moved by a driven transfer element along a guide rail between a release location corresponding to the occupant-releasing configuration of the belt and a restraint location corresponding to the occupant-restraining configuration of the belt. The movable anchor is releasably locked to a fixed anchor at the restraint location by a cam-released pawl, an inertia device, or other suitable releasable locking means.

12 Claims, 70 Drawing Figures

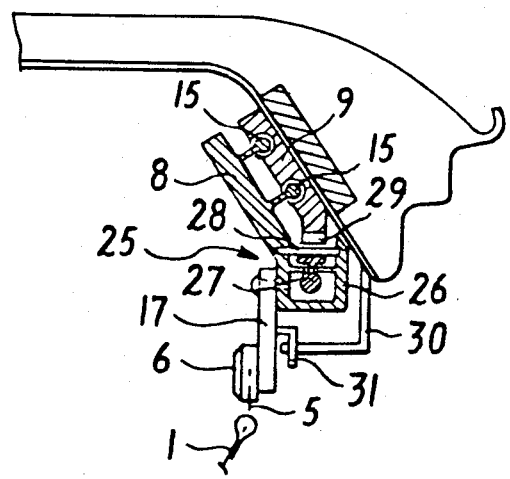
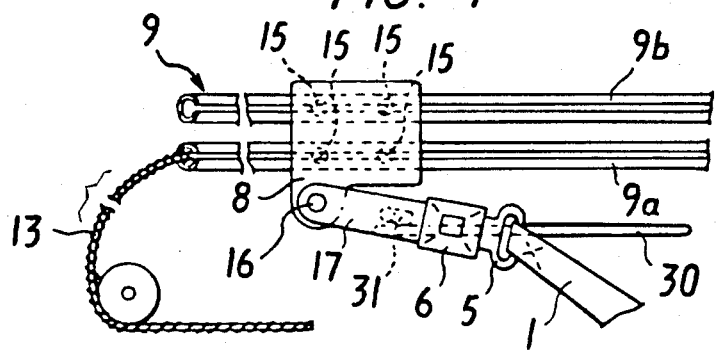
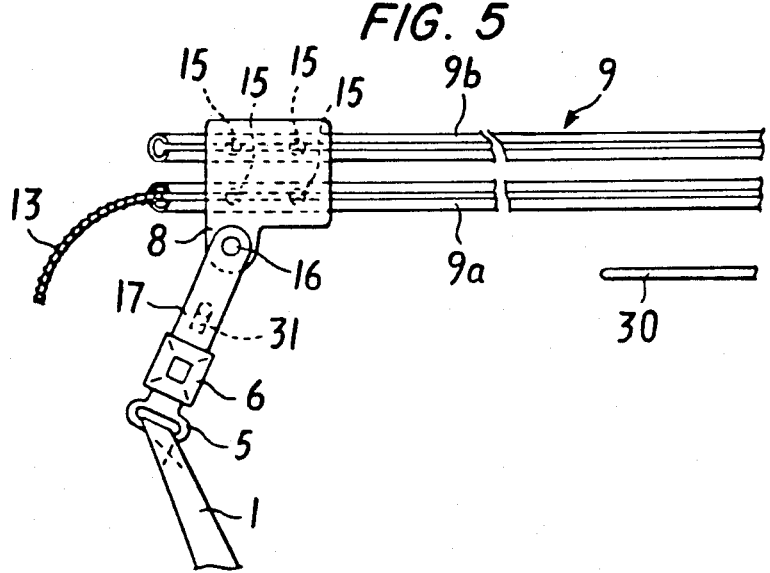

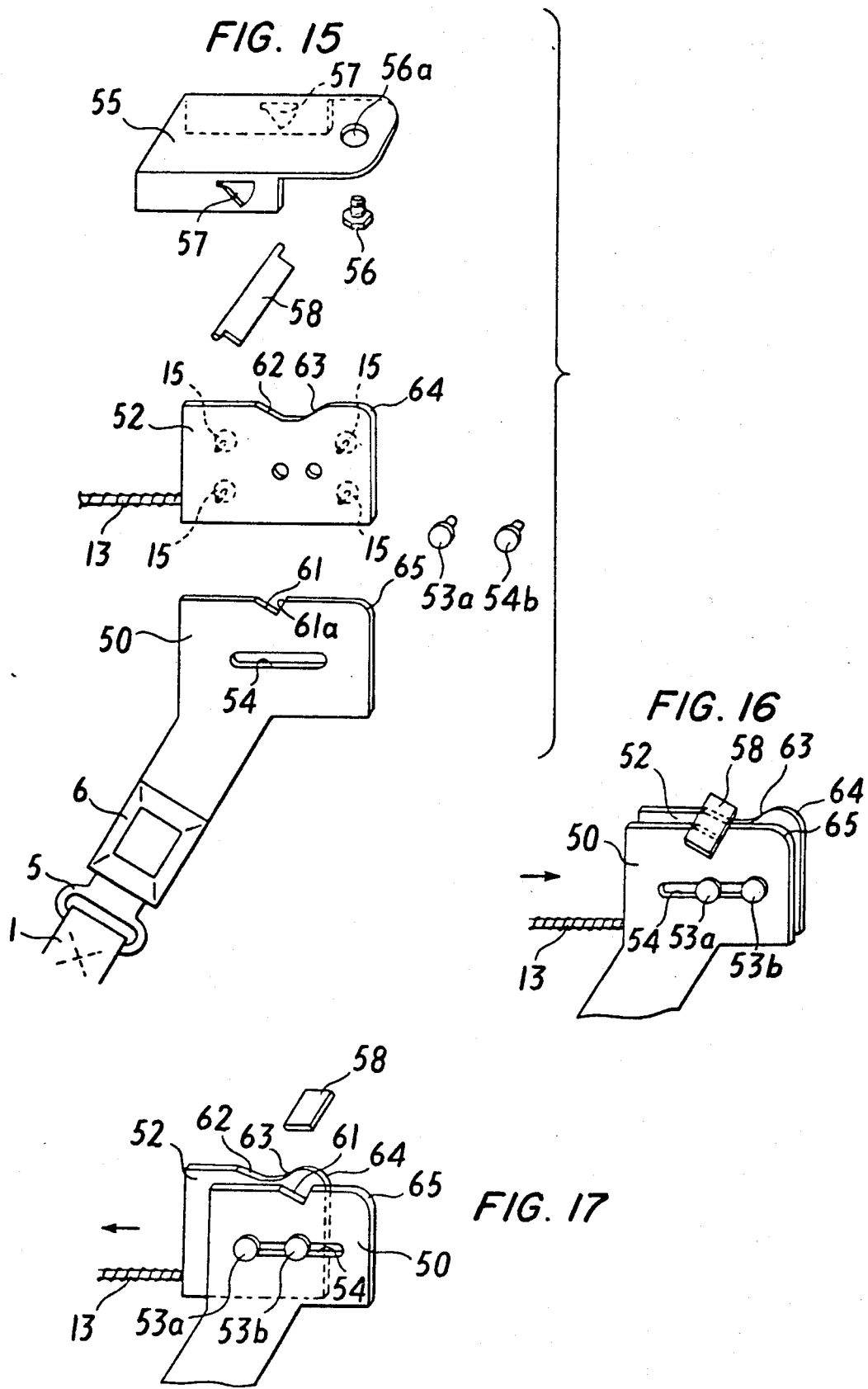

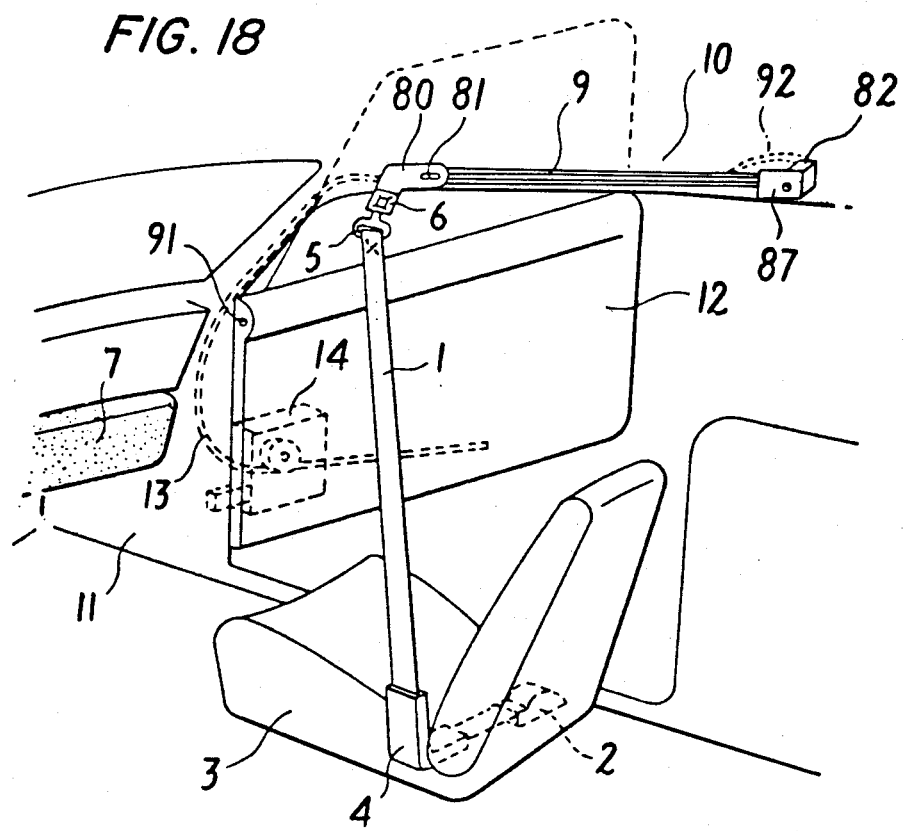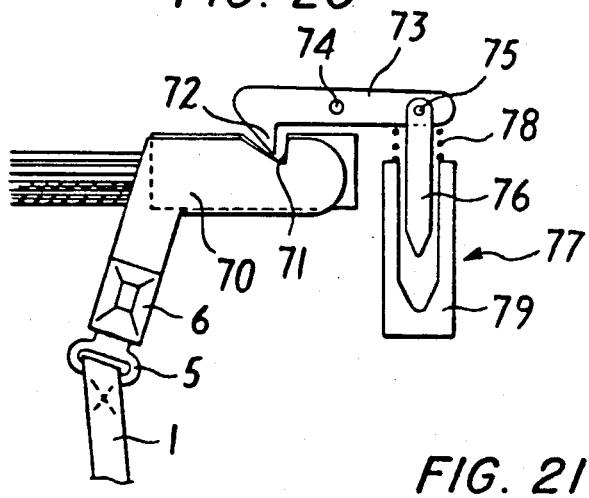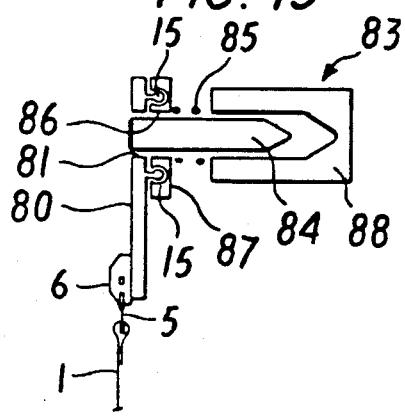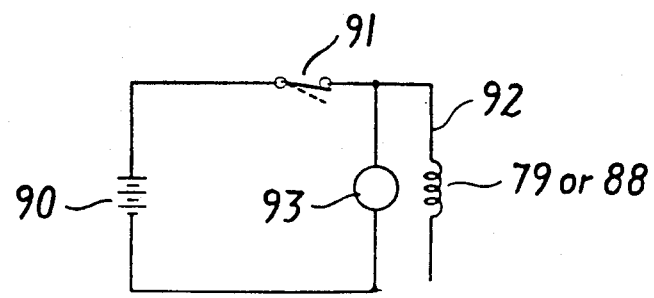

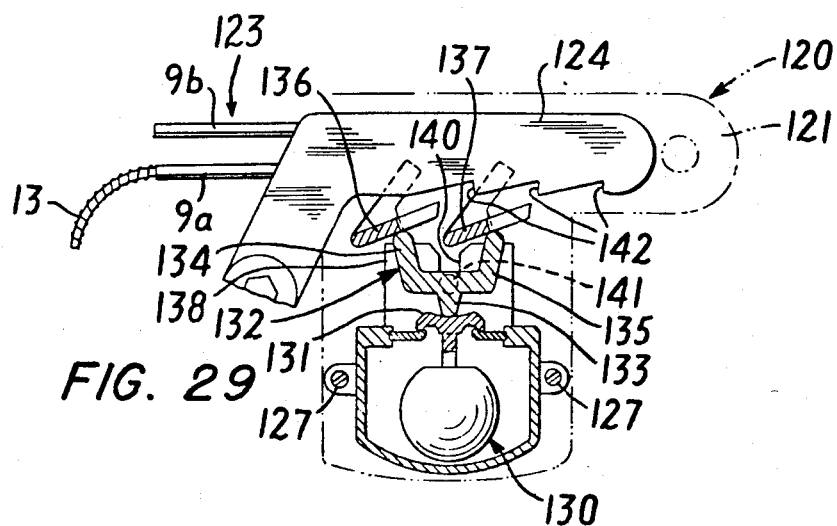
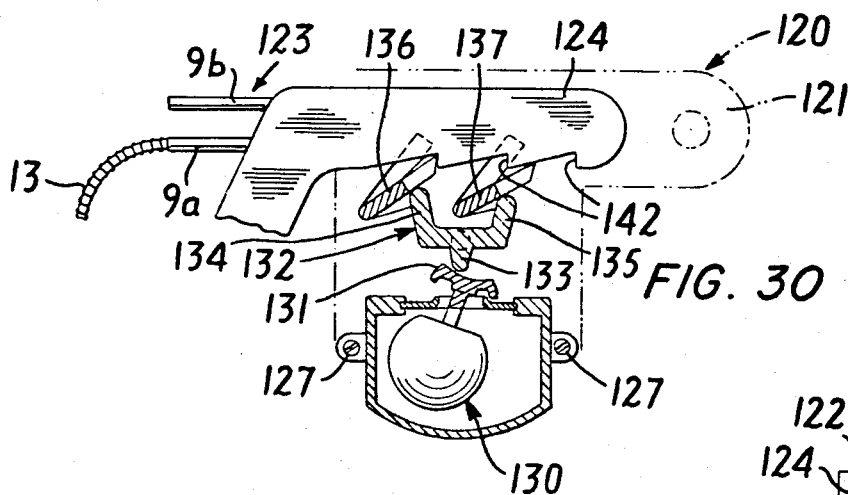
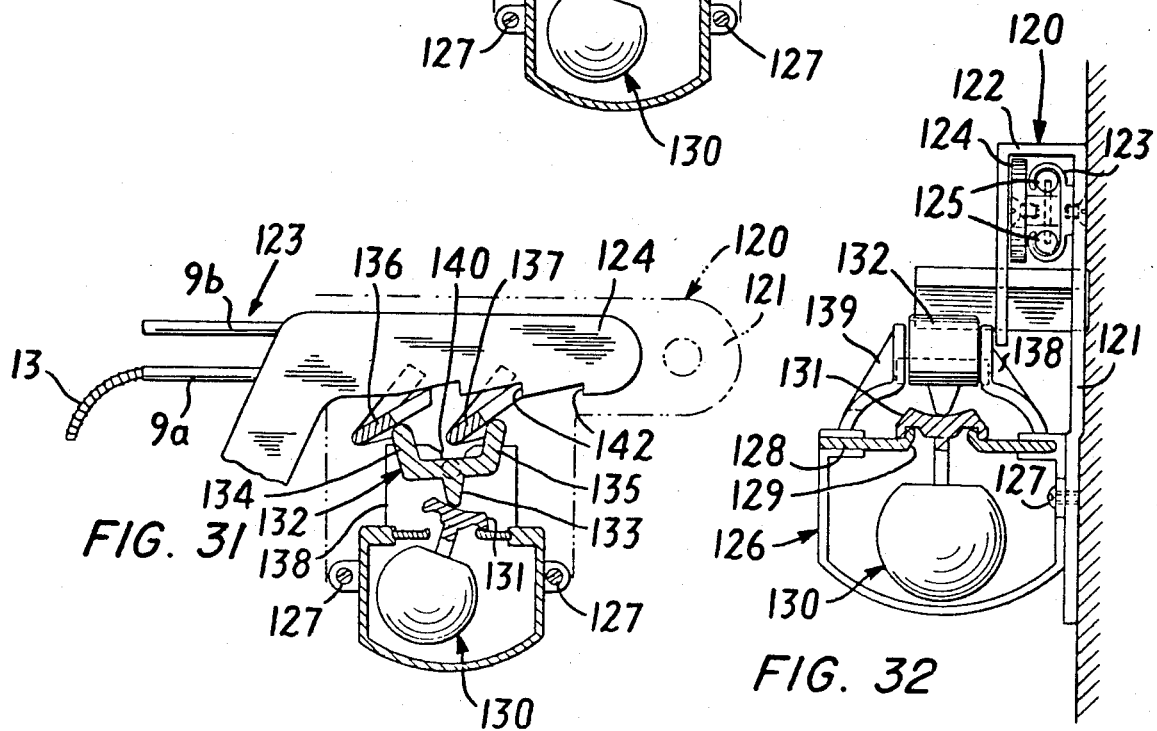

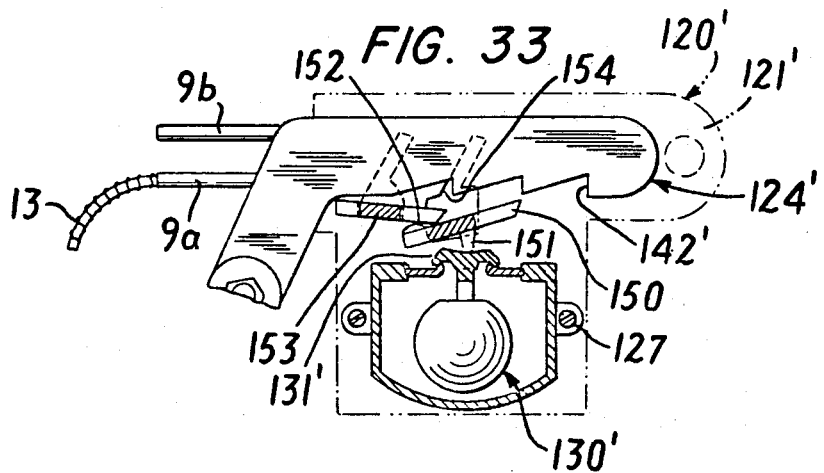
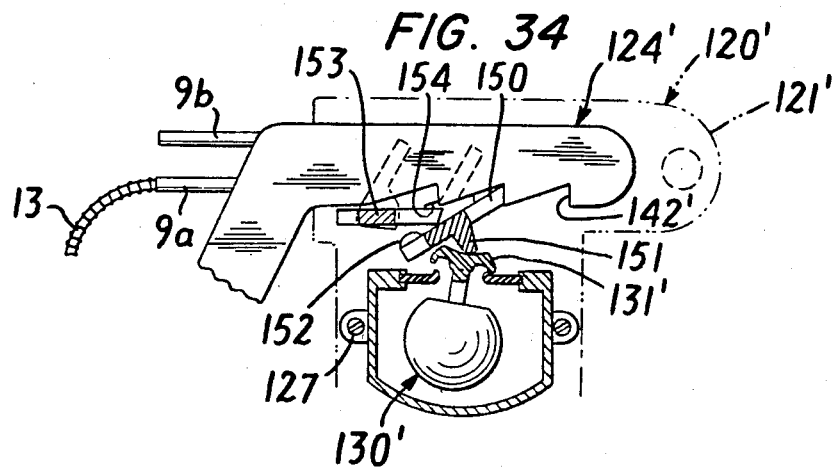
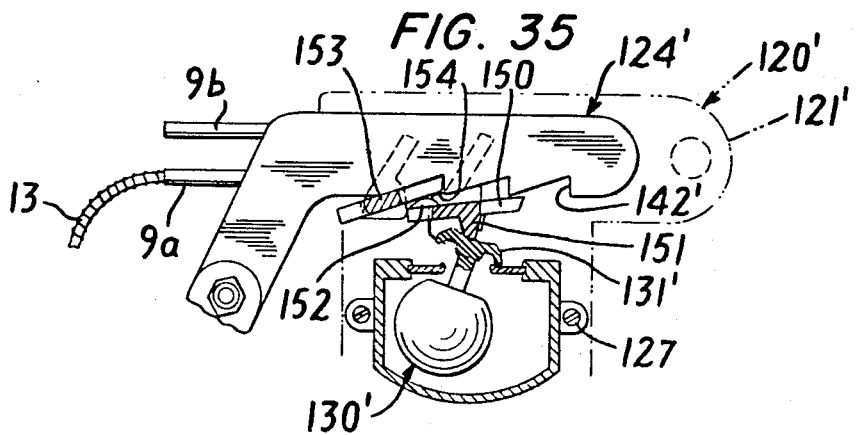

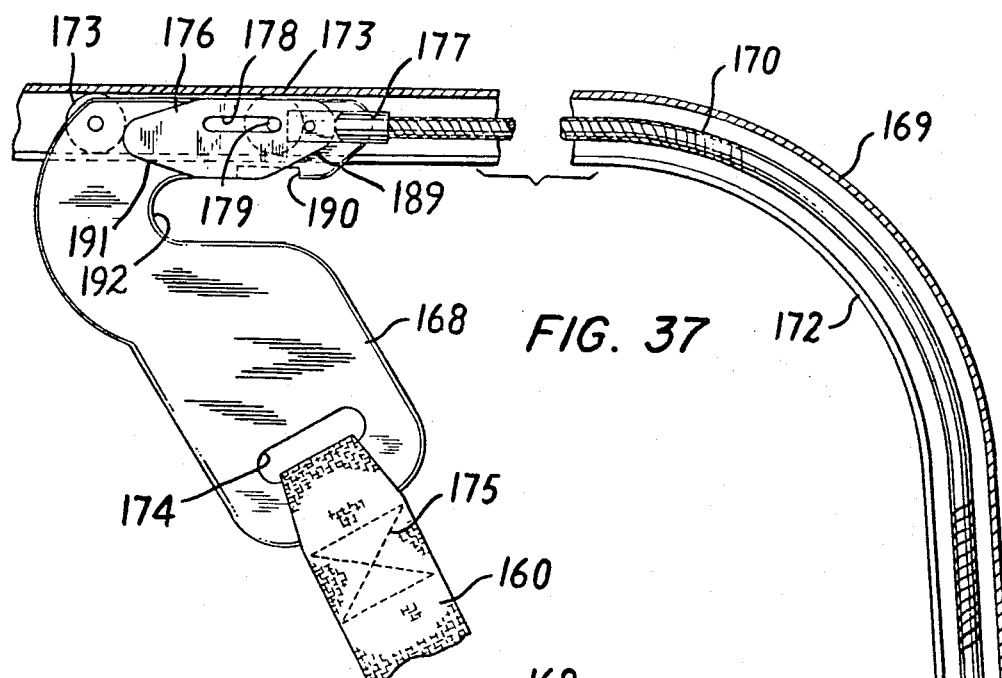
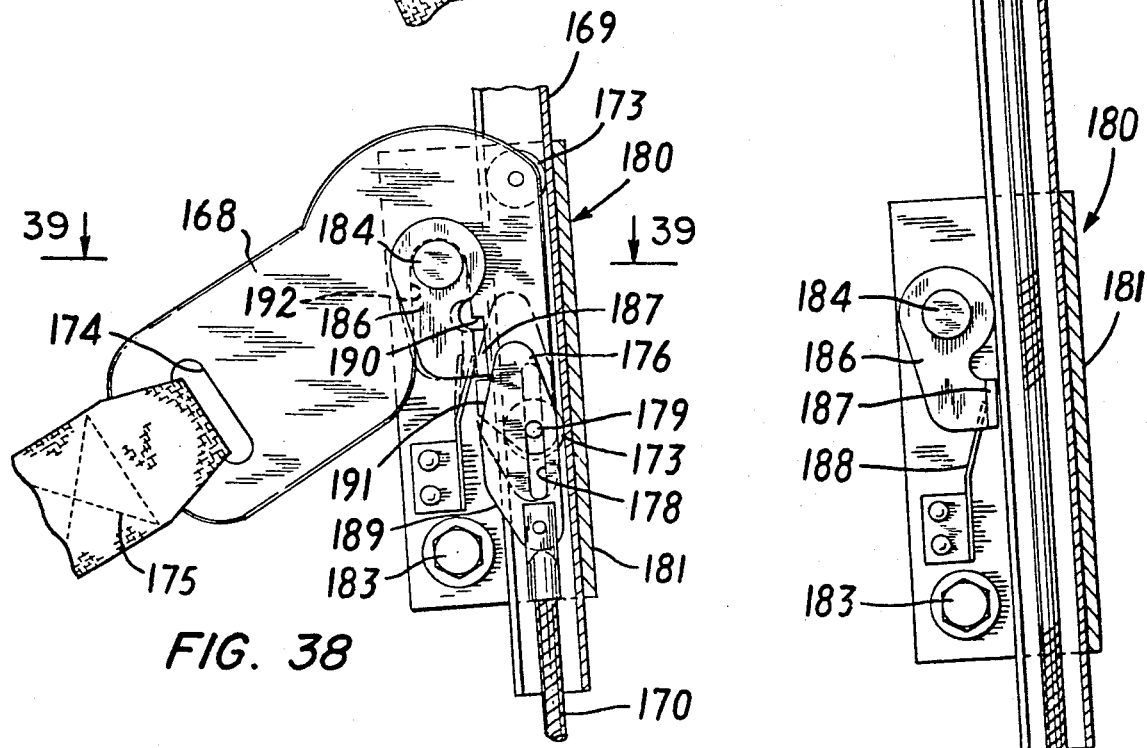
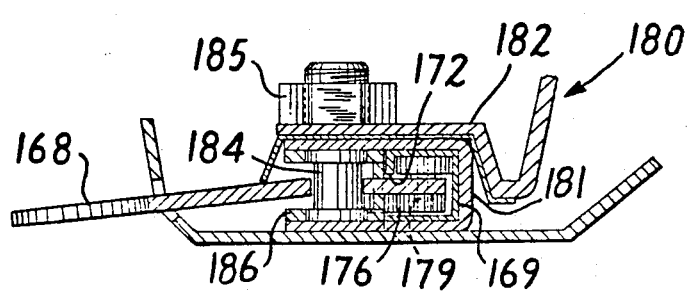
FIG. 37
FIG. 38
FIG. 39

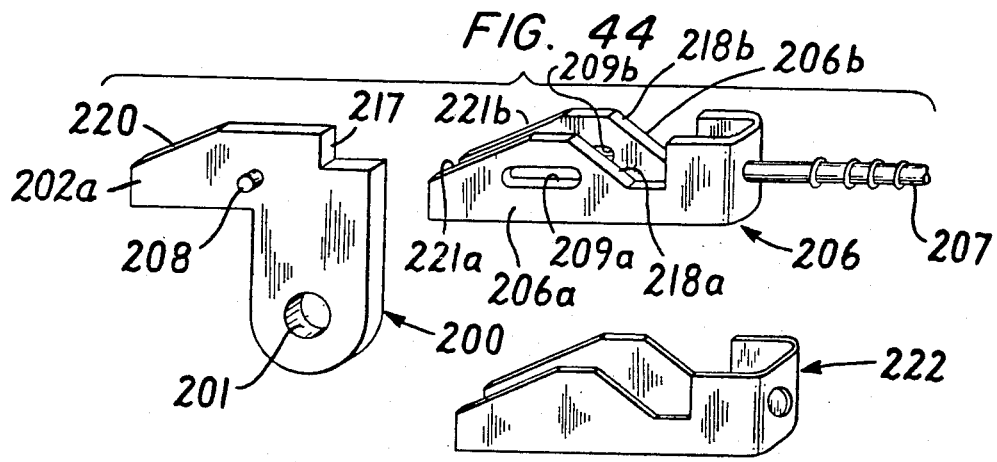
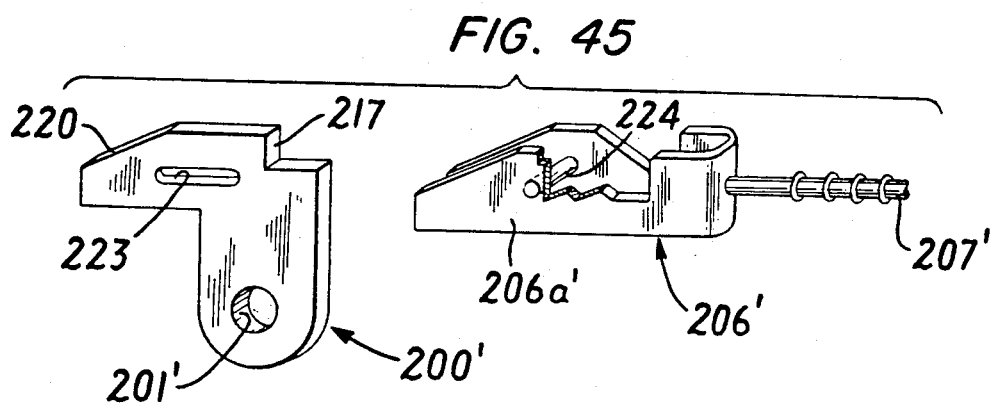
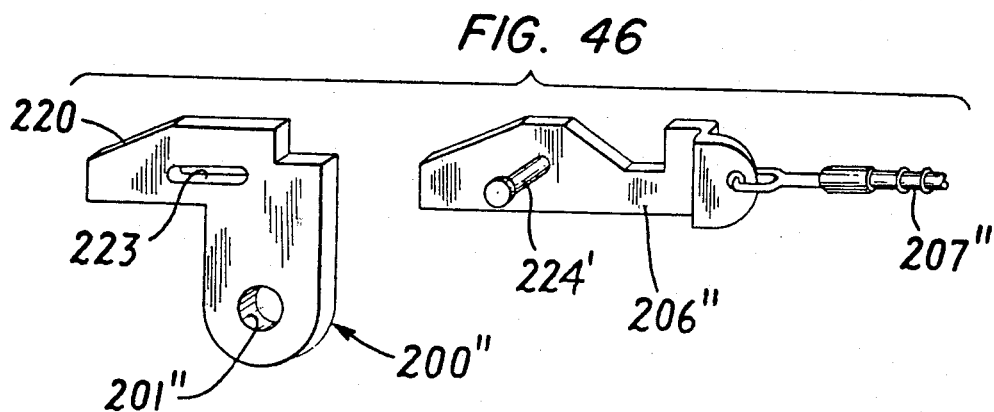

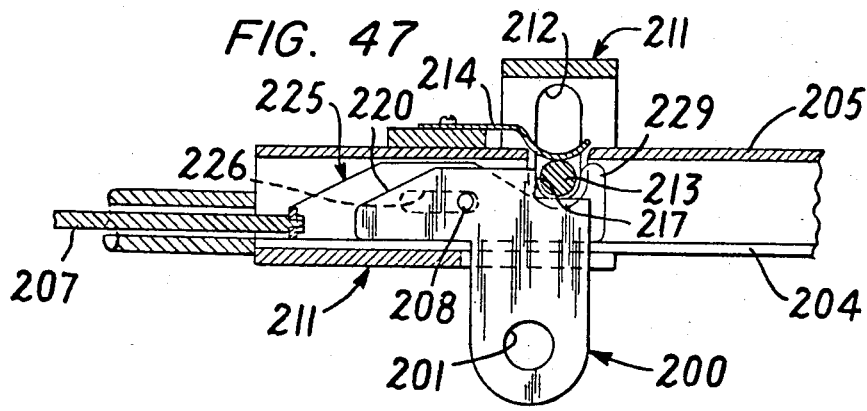
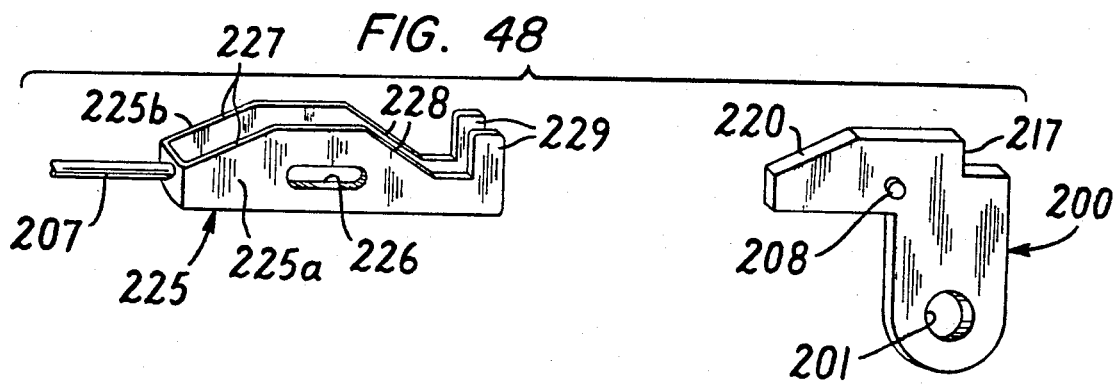
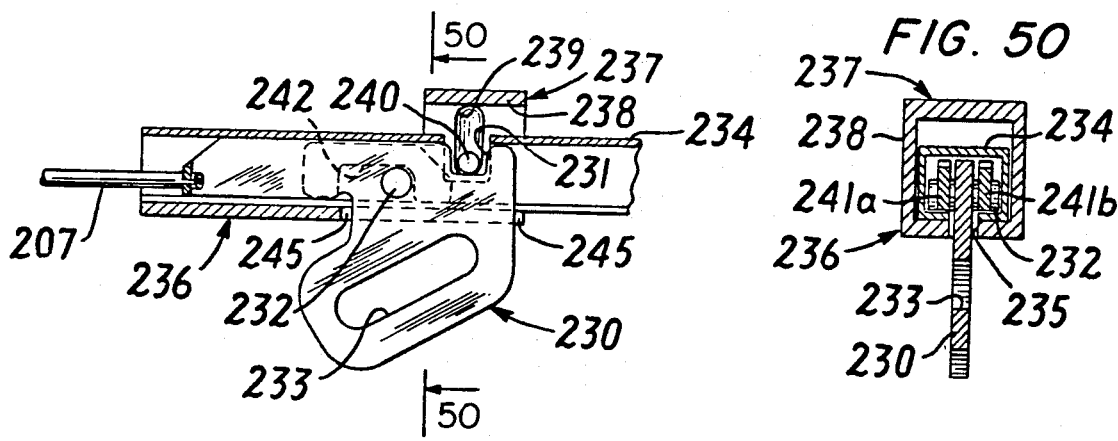
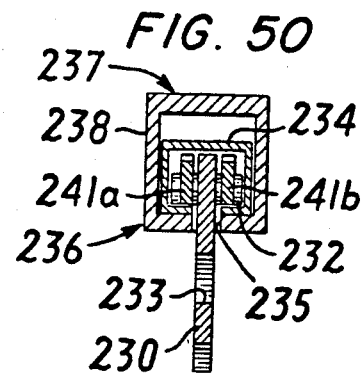
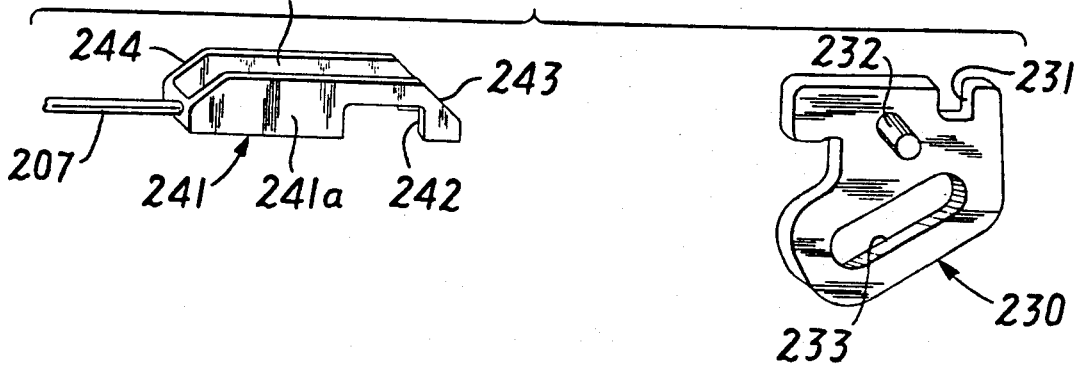

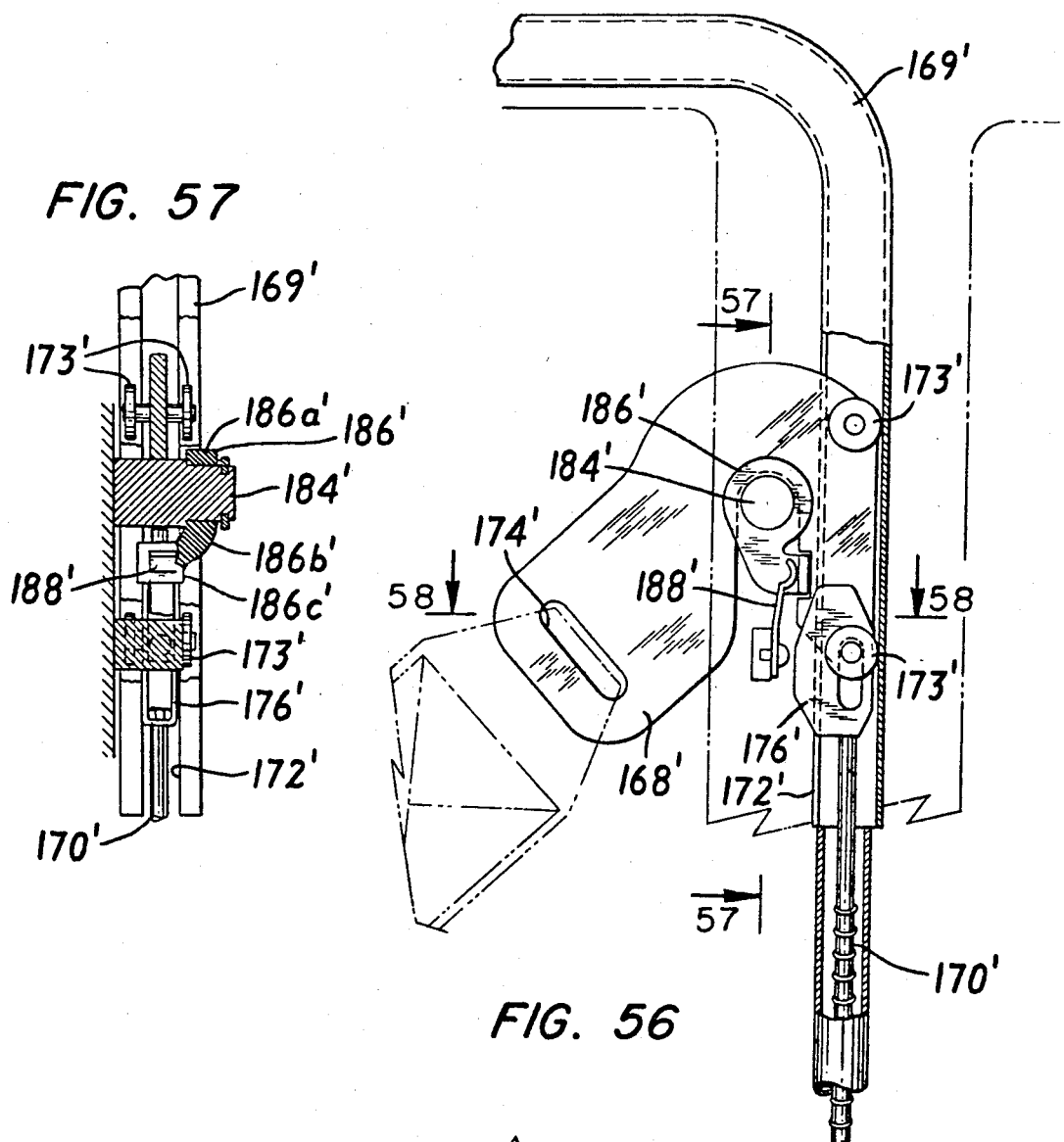
FIG. 57
FIG. 56
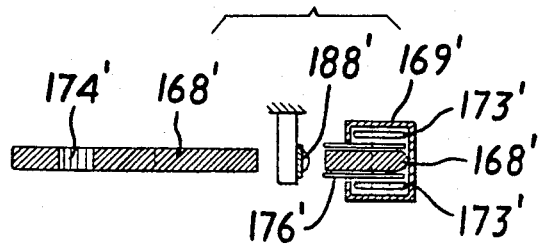
FIG. 58

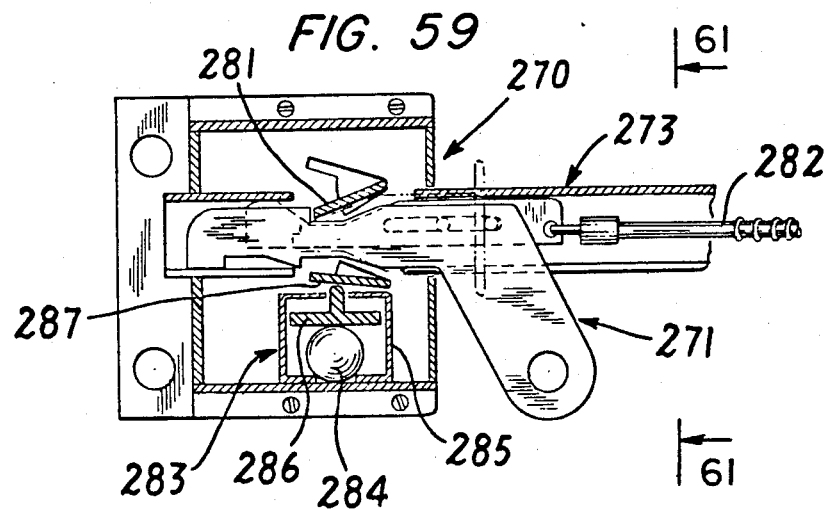
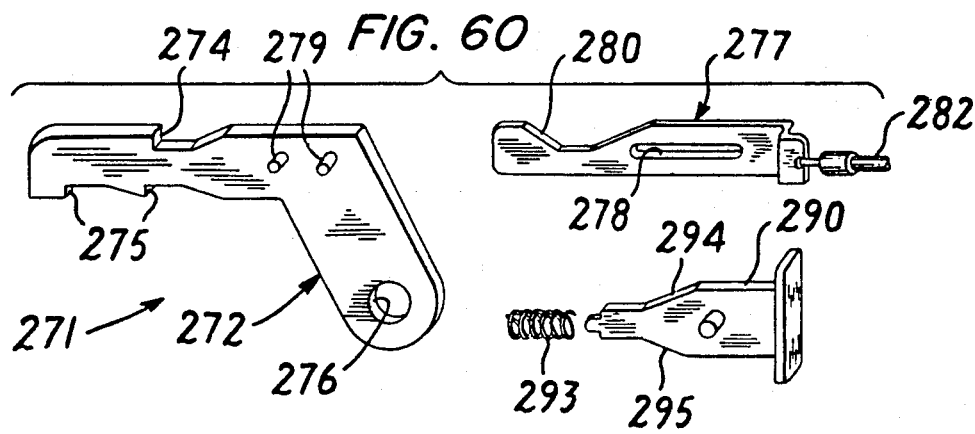
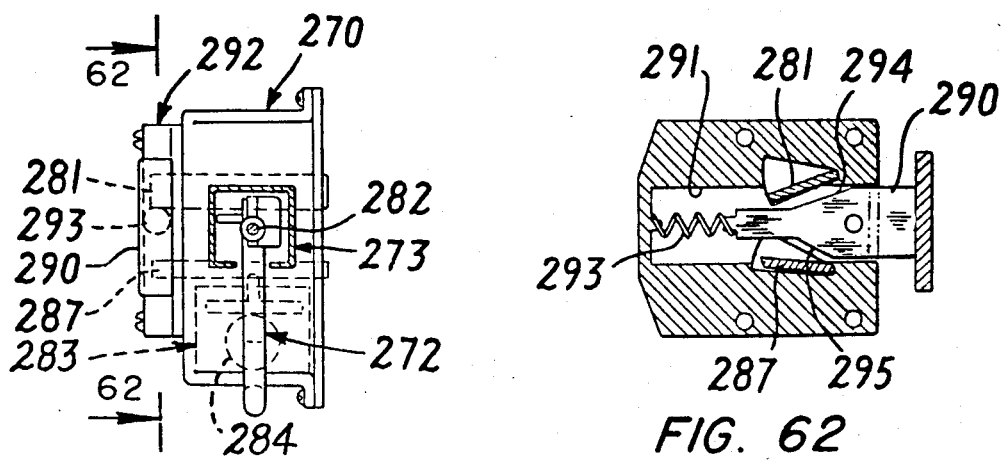

LOCKABLE MOVING BELT ANCHOR FOR PASSIVE VEHICLE OCCUPANT RESTRAINT BELT SYSTEMS

This is a division of application Ser. No. 044,196 filed May 31, 1979.

FIELD OF THE INVENTION

This invention relates to passive vehicle restraint belt systems and, in particular, to a lockable moving anchor which secures a belt in an occupant-restraining position but is released to enable the belt to be transferred to an occupant-releasing configuration.

BACKGROUND OF THE INVENTION

Many of the passive vehicle occupant restraint systems that have been proposed to improve safety and meet regulations which are likely to be adopted rather soon have one or more movable guide rings to transfer a portion or portions of a seat or shoulder belt, or both, between an occupant-releasing configuration and an occupant-restraining configuration. For example, the system may have a shoulder belt leading from a retractor mounted on the roof near the upper rear corner of the vehicle door to and through a movable guide ring which moves along a guide rail installed in the roof above the door and then across to an anchor. Similarly, a lap belt may lead from a retractor affixed to the lower rear corner of the door to and through a guide ring that moves along a rail extending diagonally up to a position near the front end of the window sill of the door and then across to an anchor on the inboard side of the seat. Each time the belts are transferred between the releasing and restraining configurations, they slide through the guide rings, and even though the rings have smooth surfaces, it is inevitable that the constant scuffing that occurs wears the belts. Moreover, it is necessary to provide a belt sufficiently long to allow a section to be unwound from the retractor so that the belt can attain the releasing configuration; this means that the retractor must be of a larger size than required for the restraint configuration.

In attempt to overcome the foregoing and other problems, there have also been proposals for passive systems in which the end of a belt is attached to a movable anchor. The movable anchor systems proposed thus far, however, have still presented problems, such as overly-complicated mechanisms for driving and locking the anchor, high manufacturing costs, and difficulties involved in establishing and maintaining the position of the anchor in the passenger-restraining configuration. The location of the moving anchor in the restraint position is particularly difficult in the case of hardtop passenger cars, which do not have a center post.

SUMMARY OF THE INVENTION

There is provided, in accordance with the present invention, an improved passive vehicle occupant restraint belt system of the type in which a restraint belt is shifted between an occupant-restraining configuration and an occupant-releasing configuration by movement of a portion of the belt along the path defined by a guide rail affixed in the vehicle. In particular the improvement comprises a movable anchor member received for movement along the rail and adapted to be coupled to the belt portion, an anchor transfer element coupled to the movable member for moving it along the rail, and a fixed anchor member at a restraint location along the rail corresponding to the occupant-restraining configuration of the belt. A locking device is provided for selectively locking the movable anchor member to the fixed anchor member so that the belt is anchored in the occupant-restraining configuration and for releasing the movable anchor from the fixed anchor so that the belt can be moved along the guide rail by the transfer element to transfer it to the occupant-releasing configuration.

The locking device may take various forms. For example, it may include an axially movable pin associated with the fixed anchor member and a socket on the movable anchor member which is adapted to receive the lock pin when the anchor member is at the restraint location. The lock pin can be moved into locking position in the socket by a sheathed wire connected to the pin at one end and connected at the other end to an operating plunger mounted in the vehicle door frame to be engaged and pushed in to shift the wire and locking pin when the vehicle door is closed. The pin can also be actuated by a spring which normally pushes it into the socket, in which case a device, such as an electrical solenoidal actuator or a cam-releasing mechanism is provided to retract the pin from the socket when the vehicle door is open, thereby to release the locking device so that the movable anchor may be moved to the release position.

Another suitable form of locking device for the moving anchor is an inertially responsive device based on a ball or pendulum working against a pawl in response to a rapid change in velocity of the vehicle. The inertia device may be located on either the movable anchor member or the fixed member anchor member; the other of the members will have one and, preferably, two or more shoulders which are engagable by the locking pawl. It is also desirable to include two pawls in connection with the inertia device to ensure that a pawl will engage a shoulder and lock the movable anchor member, rather than being improperly positioned with respect to the shoulder. Arrangements involving two pawls are described in more detail below.

Another type of locking device employs a locking pawl or locking pin on the fixed anchor member which engages a shoulder on the movable anchor member when the movable anchor member is at the restraint location. A cam member coupled to the transfer element which moves the movable anchor assembly has a cam surface which engages the locking element and releases it from the shoulder. The movable anchor is coupled to the cam member by a lost motion coupling which enables the cam member to move and release the locking element while the movable anchor member remains at the restraint location. For example, the lost motion coupling may include at least one pin on one of the coupled members and an elongated slot on the other which receives the pin for sliding and allows relative movement of the members to the extent of the length of the slot.

In the moving anchor systems, according to the present invention, which employ locking pawls or pins and cam members for releasing them, a cam member and movable anchor member may be generally flat plates which abut each other face to face and are located entirely externally of the guide rail, in which case the anchor member is located outermost, relative to the guide rail. At least two sliders on the cam member are received within the guide rail. Advantageously, there may be two parallel guide rails, which may be parts of a single rail member, and two pair of sliders, one pair for each rail, thereby to provide stable support for the cam member and movable anchor.

The invention may also employ a generally tubular guide rail which has a continuous slot along one wall. The movable anchor in such versions includes a portion received within the rail and carrying slide pins or rollers which are spaced apart lengthwise of the rail and guide the movable anchor member along the rail. A portion of the movable anchor extends out through the rail slot and receives the belt portion.

A moving anchor system, according to the invention, may also include two locking systems, for example, an inertia-responsive system which is activated in response to a rapid change in velocity of the vehicle and a normally locked, releasable system which is locked whenever the movable anchor member is at the restraint location and which is released only when the movable anchor member is to be moved away from the restraint location. A number of embodiments of such dual locking arrangements are shown in the drawings and described in detail below.

The moving anchor system can be used in a variety of restraint belt systems. For example, the outboard upper end of a shoulder belt can be secured to a movable anchor member which slides along a track above the vehicle door between a release position near the front post to a restraint position near the upper rear corner of the door or partway down the center post of the vehicle. It can also be used in connection with a lap belt and a guide rail which extends either vertically upwardly or from upwardly and forwardly from near the lower rear corner of the door. In systems in which the outboard ends of either a lap belt or a shoulder belt, or both, are secured to the door and are thus moved automatically away from the passenger when the door is opened, greater facility in entry and departure of a passenger from the vehicle is attained by arranging the inboard end of the belt or belts to move fore and aft along the inboard side of the seat. The moving anchor system of the present invention is useful on the inboard ends of the belts in such systems.

For a better understanding of the invention and a description of other features and arrangements, reference may be made to the following description of exemplary embodiments taken in conjunction with the figures of the accompanying drawings.

DESCRIPTION OF THE DRAWINGS

FIG. 3 is an end view in cross section of a roof-mounted moving anchor system;

FIGS. 4 and 5 are side elevational views of parts of another embodiment of a roof-mounted moving anchor system shown in two different positions;

FIG. 15 is an exploded pictorial view of the embodiment of FIGS. 11–14;

FIG. 16 is a schematic pictorial view of an assembled locking system of FIGS. 11–15 shown is the anchored configuration;

FIG. 17 is a schematic pictorial view of the system of FIGS. 11–16 in the released configuration;

FIG. 18 is a pictorial view in schematic form of a belt system having another embodiment of the invention;

FIG. 19 is a schematic end view of the moving anchor system of FIG. 18 in the locked position;

FIG. 20 is a modified form of the system of FIGS. 18 and 19;

FIG. 21 is a diagram of an electrical control circuit useful with the embodiments of FIGS. 18–20;

FIG. 29 is a side elevational view of an inertially actuated moving anchor system with portions of the inertia device shown in cross-section;

FIG. 30 is a view similar to FIG. 29 but showing the system in one mode of activation;

FIG. 31 is a side elevational view showing the system of FIG. 29 in another mode of activation;

FIG. 32 is an end cross-sectional view of the system shown in FIGS. 29–31;

FIGS. 33–35 show, by side views with parts broken away, another form of inertially activated system in three different operating modes;

FIG. 37 is a side elevational view of the system shown in FIG. 36 in the release position;

FIG. 38 is a side elevational view system of FIGS. 36 and 37 in the restraint configuration;

FIG. 39 is an end cross-sectional view taken generally along the lines 39—39 of FIG. 38;

FIG. 44 is an exploded view of the moving anchor components of the embodiment of FIGS. 40-44;

FIG. 45 is an exploded pictorial view of modified movable anchor components useful in the embodiment of FIGS. 40-44;

FIG. 46 is an exploded pictorial view of yet another variation of the movable anchor parts of FIGS. 40-44;

FIG. 47 is a side view cross-section of another embodiment which is very similar to that of FIGS. 40-44;

FIG. 48 is an exploded pictorial view of the movable anchor parts of the embodiment of FIG. 47;

FIG. 49 is a side cross-sectional view of another embodiment of the invention;

FIG. 50 is an end cross-sectional view taken generally along the lines 50—50 of FIG. 49;

FIG. 51 is an exploded pictorial view of the movable anchor parts of the embodiment of FIGS. 49-51;

FIG. 56 is a side elevational view of another embodiment of the invention with parts broken away;

FIG. 57 is a cross-sectional view taken along the lines 57—57 of FIG. 56 portions are broken away;

FIG. 58 is a cross-sectional view taken along the lines 58—58 of FIG. 56;

FIG. 59 is a side cross-sectional view of another embodiment of the invention;

FIG. 60 is an exploded pictorial view of the movable anchor parts of the FIGS. 59-62 embodiment;

FIG. 61 is an end view in cross-section of the embodiment of FIGS. 59-62 taken along the lines 61—61 of FIG. 59;

FIG. 62 is a cross-sectional view taken along the lines 62—62 of FIG. 61;

DESCRIPTION OF THE EXEMPLARY EMBODIMENTS

Figure 1:
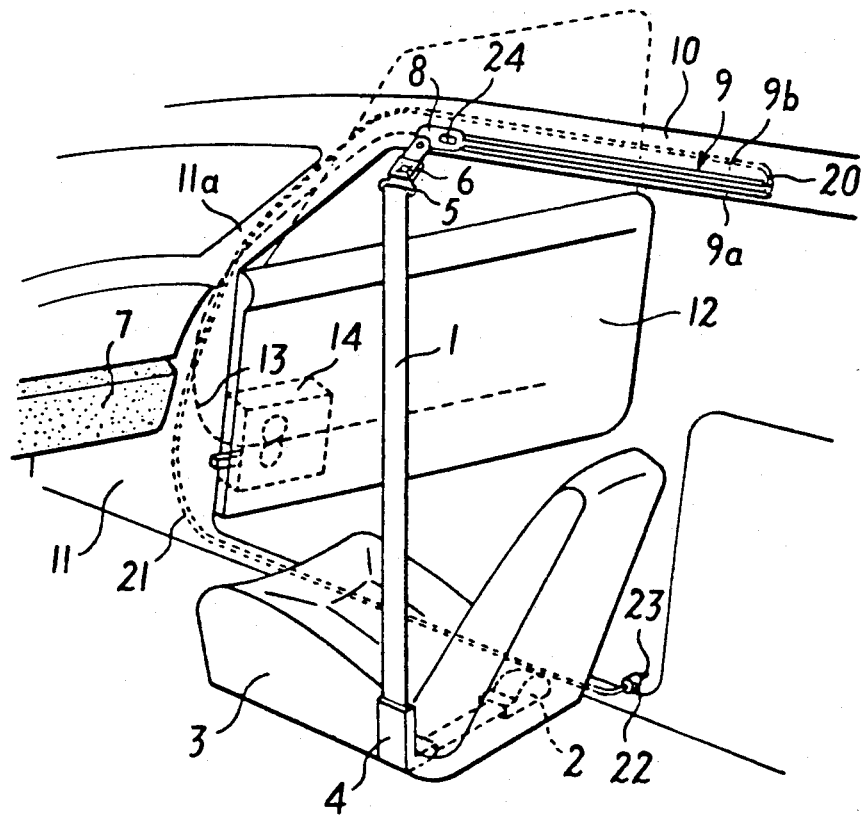
FIG. 1 is a pictorial view in schematic form of a typical restraint belt system which uses a shoulder belt and an energy absorbing knee bolster; one embodiment of moving anchor system is depicted.

The restraint belt system shown in FIG. 1 is of a type generally known per se insofar as it includes a shoulder belt 1 which leads from an emergency locking retractor 2 mounted under the seat 3 through a guide 4 on the inboard side of the seat and then upwardly and outwardly across the seat to a tongue 5 which is releasably attached to a buckle 6. In addition to the shoulder belt 1, which restrains the upper body of the vehicle occupant when it is in its restraint configuration, the restraint system shown in FIG. 1 includes an energy-absorbing knee bolster 7 which affords protection to the lower part of the occupant's body.

In accordance with the present invention, the upper, outboard end of the shoulder belt 1 is attached to the movable anchor member 8 of a moving anchor system. The moving anchor member 8 moves along a guide rail 9 mounted in the roof 10 of the vehicle body 11 generally above the door 12. The movable anchor member 8 is connected by a transfer element 13, such as a racked wire, which leads forwardly from the anchor member 8 through one of two guide parts 9a and 9b of the guide rail (see FIG. 3) and then downwardly within the front post 11a and finally turns back and leads into the vehicle door where it meshes with the output gear of a mechanical motion amplifier 14. When the door is moved from closed toward open, preferably during only part of the opening motion up to about half way open, the motion amplifier 14 pulls the wire into the door, thereby pulling the movable anchor member 8 forwardly along the guide rail 9 to a release position in which the belt 1 is in an occupant-releasing configuration, as shown in FIG. 1. When the door is closed, the mechanical motion amplifier 14 drives the wire out from the door, and pushes the movable anchor member rearwardly along the guide rail 9 into a position near the upper rear corner of the door 12.

Figure 2:
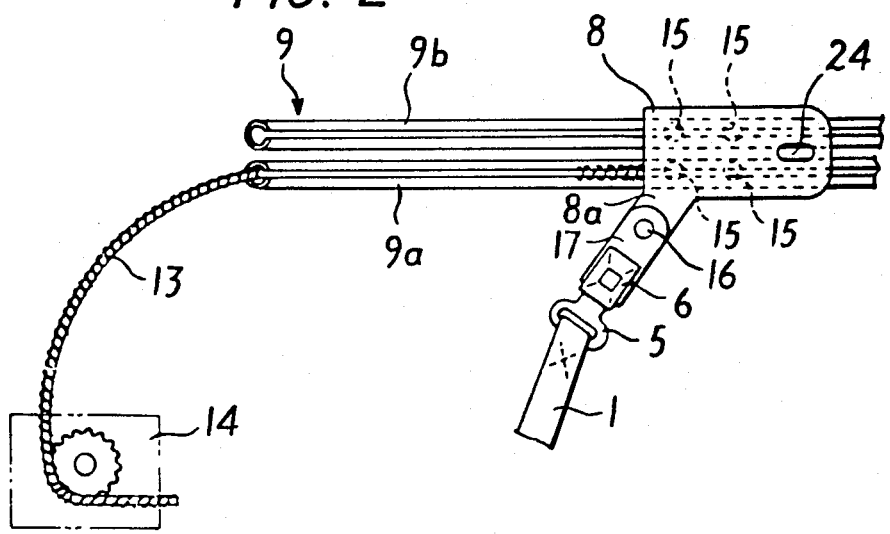
FIG. 2 is a schematic, side elevational view of part of the moving anchor system shown in FIG. 1.

In the embodiment shown in FIGS. 1 and 2 of the drawings, the movable anchor member 8 is a metal plate mounted externally of the guide rail 9 by means of four slide elements 15, one pair of which is received in the guide part 9a and the other pair of which is received in the other guide part 9b. This arrangement of four sliders in two rails stably supports the movable anchor member for smooth sliding along the rail 9. Preferably, the sliders 15 are made of a low friction plastic so they will move easily along the guide rails. In addition the movement is quiet. It is also desirable to provide a plastic coating on the racked wire to reduce the noise generated when the device operates. A tab portion 8a of the moving anchor is coupled by a pivot pin 16 to a mounting plate 17 on which the buckle 6 is mounted. The pivoting of the plate 17 about the pivot pin 16 allows adjustment of the shoulder belt to the sitting posture and the physique of the occupant. The tab 8a and the buckle mounting plate 17 locate the buckle 6 at a position about 100 mm below the guide rail 9, a position favorable for comfortable fitting of the belt to the average occupant.

The fixed anchor of the embodiment shown in FIGS. 1 and 2 is a locking pin 20 which is mounted in a socket installed in the roof at the restraint location of the moving anchor and moves axially in the socket in a direction substantially perpendicular to the face of the movable anchor member 8. The pin 20 is connected to one end of a sheathed cable 21 which leads from the pin forwardly along the roof above the door and then down along the front post 11a and finally rearwardly along the door threshold back to a plunger 22 having a spring loaded pin 23 connected to the cable. The pin is pushed in by the door when the door is closed. When the door is opened, the spring associated with the plunger pin 23 pulls the sheathed cable in a direction to hold the locking pin 20 retracted so that the movable anchor member 8 can move away from the restraint position. Such movement occurs automatically when the door is closed as the normal function of the motion amplifier 14 and the transfer element 13. As the door closes fully, the pin 23 of the plunger 22 pushes on the sheathed cable 21 which, in turn, begins to push the locking pin 20 axially outwardly into one end (the right end in FIG. 2) of an elongated hole 24 in the movable anchor member 8. As the movable anchor member 8 moves closed a final small amount during displacement of the locking pin toward its fully extended, locking position, the elongated hole 24 allows such movement so that the final position of the pin is generally in the left end of the hole 24, as depicted in FIG. 2.

Among the various modifications that will be apparent to those skilled in the art is the substitution of an electrical motor drive for the motion amplifier 14. The smooth running and quiet operation of the passive belt system of FIGS. 1 and 2 are assured with both mechanical and electrical drive devices by the dual guide rails and the four sliders on the movable anchor member.

As an optional, though desirable, modification of the moving anchor system of FIGS. 1 and 2, the arrangement shown in FIG. 3 involves the addition of an emergency locking mechanism 25. In particular, a case 26 on the movable anchor member 8 receives a pendulum 27 and pawl 28. The pendulum 27 responds to a rapid change in velocity of the vehicle in any direction and moves the pawl 28 into locking engagement with a rearwardly facing locking shoulder 29 on the rearward end portion of the track 9. Accordingly, when the movable anchor member 8 is at the restraint location, it is not only held in that position by the anchor pin 20, (FIG. 1) but, in the event of a collision or other emergency involving a rapid change in velocity in the vehicle, pawl 28 engages the shoulder 29 and locks the movable anchor member to the fixed anchor (which in this case is constituted by the shoulder 29 on the guide rail 9). The inertial responsive mechanism 25 is a backup system which anchors the movable anchor member at the restraint location in the event that, for one reason or another, the anchor pin 20 becomes disabled or damaged and does not operate properly.

As a further feature of the embodiment of FIGS. 1 and 2, it is desirable, though not necessary, to provide a guide plate 30 below the rail 9 for controlling the pivoting movement of the buckle mounting plate 17 about the pivot pin 16 during movement of the movable anchor. The guide plate 30 extends partway along the length of the rail so that during forward movement of the movable anchor member 8 an arm 31 on the buckle mounting plate 17 bears against and rides along the guide plate 30 (see FIG. 4). The trailing position of the buckle and belt 1 out behind the anchor 8 provides a more balanced force condition which ensures that the moving anchor moves smoothly without oscillating. Near the release position (see FIG. 1) the follower 31 on the buckle mounting plate 17 ceases to ride along with mounting plate 30 and moves into a normal position (FIG. 5). When the movable anchor member 8 moves back from the release to the restraint location the follower 31 again engages the guide plate 30, and similarly to the configuration shown in FIG. 4, but in reverse, the buckle mounting plate 17 rides out in a trailing position relative to the direction of movement of the movable anchor member 8.

It is highly desirable with the embodiment of FIGS. 1-3, which has an emergency release buckle 6, to provide an alarm (not shown) to indicate that the buckle has been detached. It is intended that the buckle only be released in the event of an emergency but that it otherwise remain attached in normal use of the vehicle.

Figure 6:
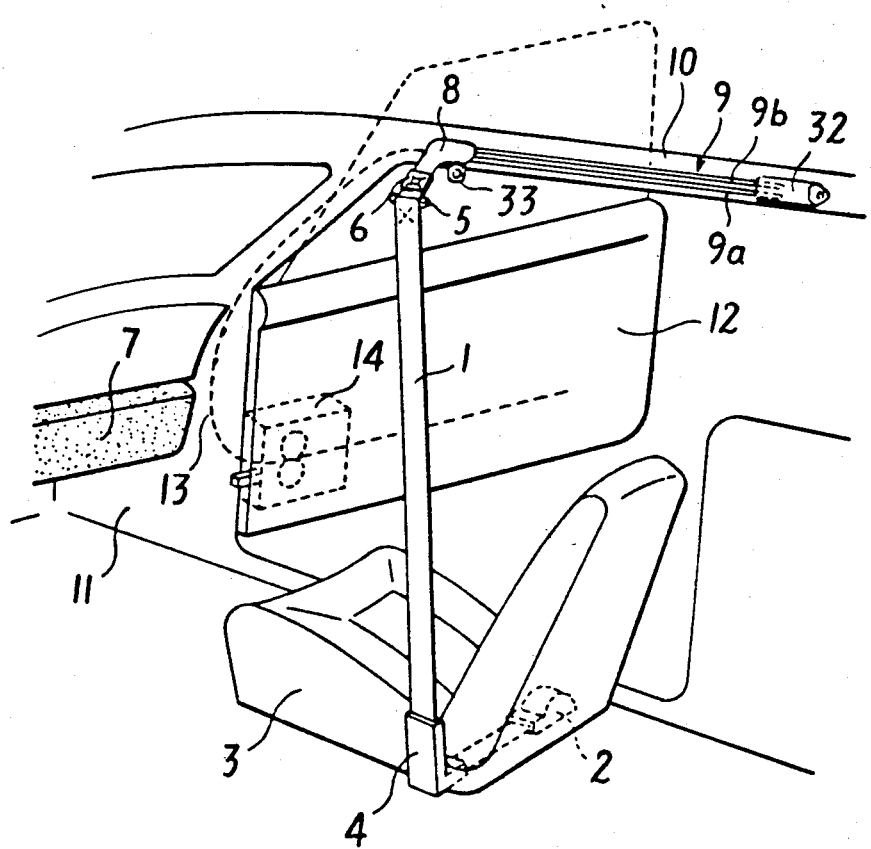
FIG. 6 is a pictorial view of a restraint belt system having another form of moving anchor system.
Figure 7:
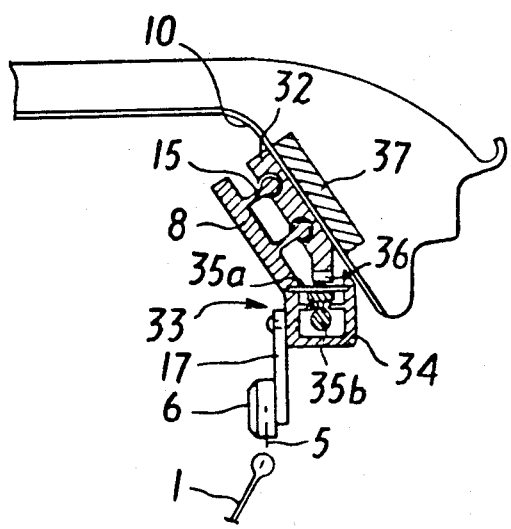
FIG. 7 is an end cross-sectional view of the moving anchor system shown in FIG. 6.

FIGS. 6 and 7 illustrate an embodiment of the invention that is similar to that shown in FIGS. 1 through 3 but has two important differences. Accordingly, the same reference numerals are applied to FIGS. 6 and 7 as are used in FIGS. 1 through 3 except in respect of the modifications. In the embodiments of FIGS. 6 and 7 the locking device for locking the moving anchor 8 to a fixed anchor 32 is an inertia device 33 consisting of a casing 34 carrying a pawl 35a and a pendulum 35b. The device shown in FIG. 7 is substantially identical to the device shown in FIG. 3 and described above. The fixed anchor 32 is a plate-like member having a locking shoulder 36 which is engaged by the pawl 35a when the pendulum 35b pivots in response to an abrupt change in velocity. The fixed anchor 32 is strongly attached to a frame member 37 of the vehicle roof 10. The embodiment of FIGS. 6 and 7 does not have the locking pin 20 and the associated sheathed cable and plunger. Accordingly, it locks solely in response to an emergency situation involving an abrupt change in vehicle velocity.

Figure 8:
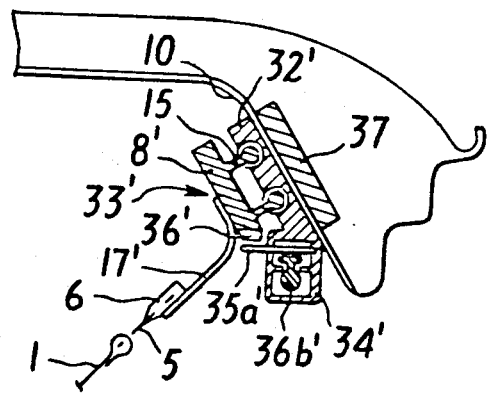
FIG. 8 is a cross-sectional view of a system similar to that shown in FIG. 6 but modified in certain respects.

FIG. 8 of the drawings shows, as a modification of the embodiment of FIGS. 6 and 7, the relocation of an inertia device 33' on a fixed anchor 32' and a forwardly facing shoulder 36' on the moving anchor 8'. A mounting plate 17' for the buckle 6' is bent inwardly and downwardly so that the buckle lines up to the inward and downward inclination of the shoulder belt 1.

Figure 9:
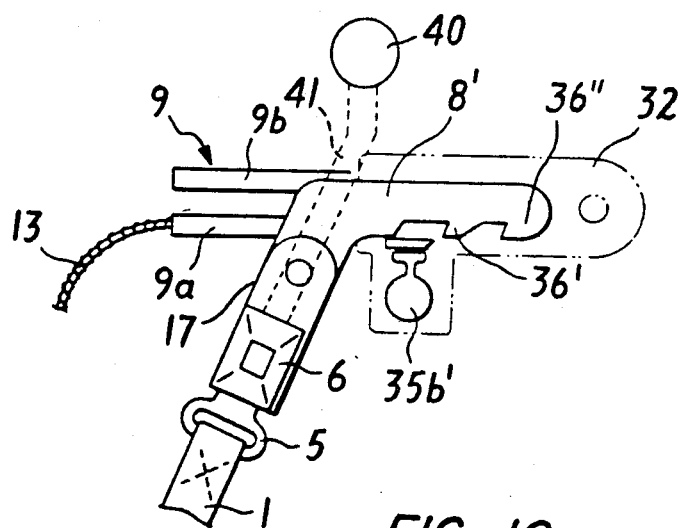
FIG. 9 is a side-elevational view of another moving anchor system.

It is desirable, as shown in FIG. 9, to provide in inertia-responsive locking devices a pair of shoulders or abutments 36' and 36" on the moving anchor 8' to improve the reliability of the locking so that if the anchor 8' is not properly positioned for engagement of the pawl with the front shoulder 36', there still remains a rear shoulder 36" with which the pawl will become locked. FIG. 9 also illustrates (schematically) an alarm 40 having a circuit 41 which includes a switch or contacts which are closed when the tongue 5 on the belt 1 is detached from the buckle 6.

Figure 10:
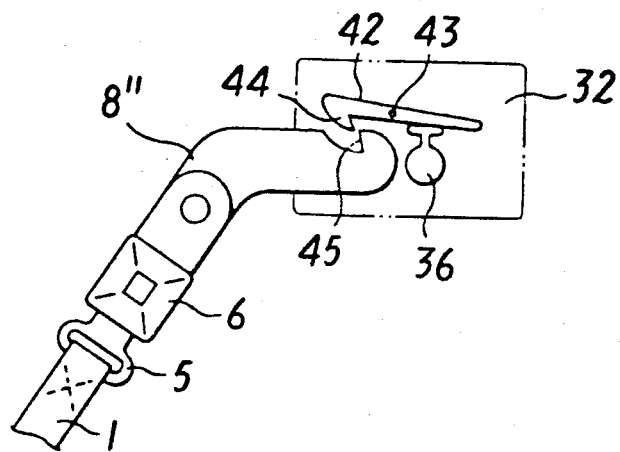
FIG. 10 is a side-elevational view of still another embodiment of the invention.
Figure 11:
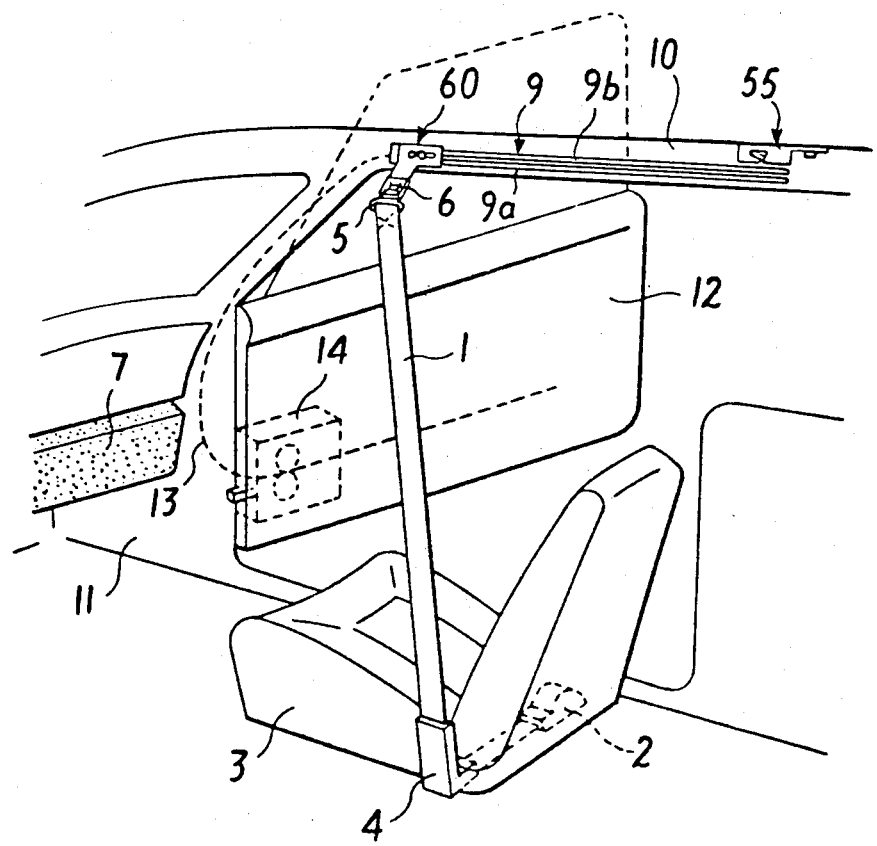
FIG. 11 is a schematic pictorial view of a restraint system which has a pawl and a cam-releasing locking device.
Figure 12:
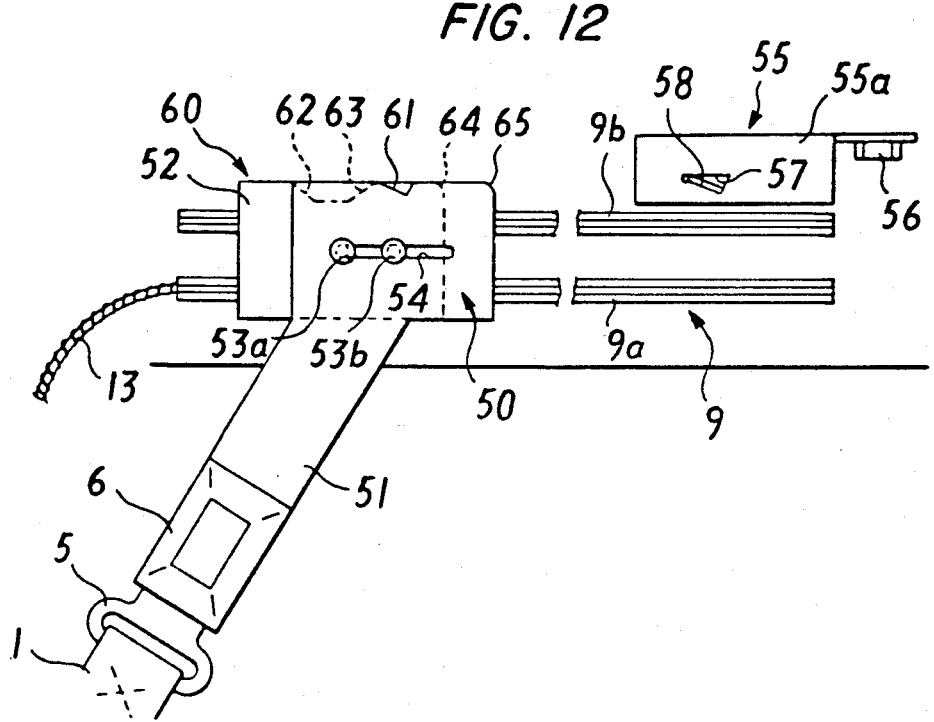
FIG. 12 is a side-elevational view of the major parts of the locking system shown in FIG. 11.

Instead of having a pawl which pivots in generally triangular slots in the casing (not shown, but well-known to those skilled in the art) the locking pawl may be a pivot arm 42 (FIG. 10) mounted to pivot about a pin 43 and having a tooth 44 which engages a locking shoulder 45 on a moving anchor 8".

The seat belt system shown in FIGS. 11-17 is substantially the same as the system shown in FIGS. 1-10 but employs another form of locking device. The same reference numerals are applied to the components of the belt system of FIGS. 11-17 as were applied to FIGS. 1-10, and reference may be made to the foregoing description in connection with the corresponding components and the overall function of the system. A moving anchor assembly 60 comprises a plate-like movable anchor member 50 having a tab 51 which extends downwardly and forwardly and carries the buckle 6. The transfer wire 13 extends into the lower guide rail part 9a of the rail 9 and is suitably connected to a cam member 52, another plate-like element having two pairs of sliders 15 extending from the rear face into the guideways 9a and 9b of the track 9. The rail and slider arrangement is generally the same as that shown in FIGS. 1-10 and described above. Thus, the drive wire 13 imparts motion to the cam member 52, which slides smoothly along the track 9 in either direction depending upon whether the door is being opened or closed. The cam member 52 is coupled to the movable anchor member 50 by a lost motion coupling in the form of a pair of longitudinally spaced-apart pins 53a and 53b which projct from the outer face of the cam member and are slidably received in an elongated slot 54 in the movable anchor member 50. As may best be observed in FIG. 16, when the door is moved in the closing direction, the transfer wire 13 pushes the cam member 52 rearwardly (as indicated by the arrow) and therefore slides it back relative to the movable anchor member 50 until the rearward pin 53b bears against the rearward end of the slot 54 to transmit force and motion from the cam member 52 to the anchor member 50. As shown in FIG. 17, when the door is moved in the direction from closed toward open, the transfer wire 13 pulls the cam member 52 forward (as indicated by the arrow), and the lost motion coupling allows the cam member 52 to slide foward relative to the anchor member 50 until the front pin 53a engages the front end of the slot 54 in the anchor member.

The fixed anchor 55 of this embodiment is a relatively strong, generally U-shaped bracket 55a having a hole 56a so that it can be fastened by a bolt 56 to a strong frame member 10a of the roof structure. Generally triangular slots 57 in the flange portions of the fixed anchor back 55a receive a locking pawl 58 which normally lies against the lower edges of the slots by reason of gravity; it can also be spring-loaded to that position. When the moving anchor assembly 60 (the cam member 52 and the movable anchor member 50 move to a rearward position along the track 9, in which event the door has been fully or substantially fully closed, the locking pawl 58 drops into a notch 61 in the upper edge of the moving anchor 50 (see FIG. 15), the rearward edge 61a of which is a locking shoulder on the movable anchor member 50. The upper edge of the cam member 52 also has a notch, the forward edge 62 of which defines a space which is large enough to allow the locking pawl 58 to drop into the notch 61 for locking engagement with the locking shoulder on the movable anchor member 50. The rearward surface 63 of the notch in the cam member 52 is a camming surface, the operation of which may perhaps be best understood by comparing FIGS. 16 and 17.

Figure 13:
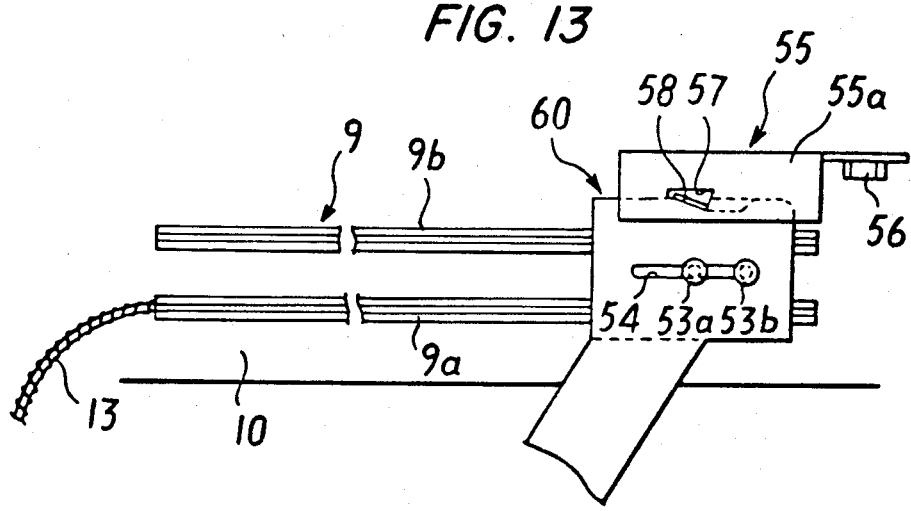
FIG. 13 is a side-elevational view of the embodiment shown in FIG. 12 in the anchored, restraint position.
Figure 14:
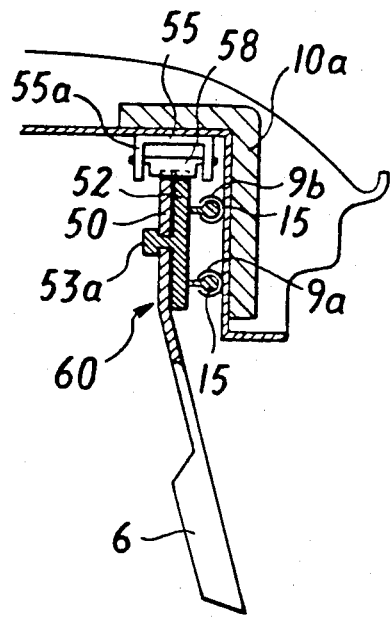
FIG. 14 is an end cross-sectional view of the system shown in FIGS. 11–13 in the anchored, restraint location.

When the moving anchor 50 is in the restraining position (see also FIGS. 13 and 16), the locking pawl 58 engages the locking shoulder 61a of the notch 61. At this point the door is closed, and the cam member 52 has been driven to its rearward-most position (both absolutely and relative to the movable anchor member 50) by the transfer wire 13. In this position the cam surface 63 lies clear to the rear of locking pawl 58. When the door is opened slightly from the closed position the transfer wire 13 pulls the cam member 52 forwardly (see FIG. 17) while the lost motion coupling (the pins 53 and the elongated slot 54) permits the movable anchor 50 to remain stationary. Upon forward movement the cam surface 63 of the cam member 52 engages the lower rearward edge of the locking pawl 58 and pivots the pawl upwardly out of engagement with the locking shoulder 61a of the notch 61 on the anchor member 58. At about the same time—i.e., when the locking pawl has been fully disengaged from the locking shoulder of the movable anchor 50—the limit of the lost motion coupling is reached (the position shown in FIG. 17). Accordingly, as the door is swung open the movable anchor is free to move with the cam member 52 in the manner previously described and readily apparent from FIGS. 12 and 17. When the door is closed again, the moving anchor assembly 60 moves back to the configuration shown in FIG. 16. A suitable cam surface 64 on the upper rear corner of the cam member 52 and a similar cam surface 65 on the upper rear corner of the movable anchor member 50 (one of those surfaces will suffice) engage the locking pawl as the movable anchor assembly moves under the fixed anchor 55, thereby pivoting the locking pawl 58 upwardly to clear the rear upper edges of the cam member and movable anchor until the movable anchor assembly reaches the locking, restraint position (FIG. 13).

An electro-mechanical locking device may, according to the invention, also be used in a passive seat belt system. Examples of such devices are shown in FIGS. 18 to 21 in conjunction with a belt system that is substantially the same as those described above. Corresponding components of the seat belt system shown in FIG. 18 are assigned the same reference numerals as are used in FIGS. 1 to 17.

The embodiment shown in FIGS. 18 and 19 comprises a plate-like movable anchor 80 which has an elongated, lengthwise hole 81. The fixed anchor 82 includes an electrical solenoid 83, the pole piece 84 of which is spring-loaded by a spring 85 outwardly to be received within the hole 81 after passing through a hole 86 in a plate 87 secured to the vehicle roof at the rearward end of the rail 9. The electromagnetic coil 88 of the solenoid is de-energized when the door is closed and energized when the door is open, thereby to retract the pole piece 84 against the spring 85 and withdraw the pin from the hole 81 in the movable anchor 80.

In another form of electro-mechanical locking device (FIG. 20) a moving anchor 70 is provided with a locking shoulder 71 in the upper edge and, when the door is closed and the movable anchor 70 is at the restraint location, a locking tooth 72 on one end of a pawl 73 which pivots about a pin 74 is in a position for engagement with the locking shoulder 71. The other end of the pawl 73 is connected by a pin 75 to a projecting portion of a pole-piece 76 of an electrical solenoid 77. A spring 78 pivots the pawl 73 in a direction to engage the locking tooth 72 with a locking shoulder 71 of the movable anchor member 70. When the door is closed and the movable anchor member is in the restraining position (FIG. 20) the electromagnetic coil 79 of the electrical solenoid 77 is de-energized (as will be described below). Accordingly, the spring 78 retains the pole in a position for locking.

A control circuit suitable for use with either of the two forms of electromechanical locking device of FIG. 19 or 20, as shown in FIG. 21, consists of a battery 90, which may be the battery of the vehicle, a switch 91 in the door frame (see FIG. 18) which is open when the door is closed and closed when the door is open, and the coil 79 (or 88) of the electrical solenoid. Advantageously, the electrical leads 92 of the coil 79 or 88 may, in practice, be wired in parallel with a courtesy lamp 93.

One point that should be mentioned about the embodiments of FIGS. 18-21 is that some motion of the moving anchor 70 or 80 away from the restraining position should be afforded prior to release of the pole 73 or disengagement of the pole piece 84, inasmuch as slight opening movement of the door must take place before the switch 91 is closed to energize the respective solenoid and release the locking pin or pawls. This is accomplished in the embodiment of FIG. 20 by arranging the system so that in the restraining position with the door fully closed, there is some clearance between the locking tooth 72 on the pawl 73 and the locking shoulder 71 on the movable anchor. In the case of the embodiment of FIG. 19 the elongation of the slot 81 in the movable anchor 80 permits such motion to take place, provided that in the restraining position with the door fully closed, the pin 84 resides in a forward position in the hole 81. Thus, strictly speaking, these two embodiments involve the positioning of one component of a locking system in a location closely adjacent to, but not in engagement, with a locking shoulder—in both instances, however, the locking device is in position for engagement to anchor the belt in an emergency.

Corresponding components of the embodiment shown in FIGS. 22-28 of the drawings are assigned the same reference numerals as those of the embodiments of FIG. 9 and FIGS. 11 to 17. Because of the similarity, which will be apparent from the following description, of this embodiment to those of FIGS. 9 and 11 to 17 used in combination with each other, it will suffice merely to describe briefly the mode of operation and to refer in the course of such description to the principal elements. In view of modifications required to combine two locking devices, prime suffixes have been applied to certain of the reference numerals to indicate that they are different. To avoid possible confusion, some additional reference numerals have been applied to FIGS. 22-27, even though the components are essentially the same in structure and function.

Figure 22:
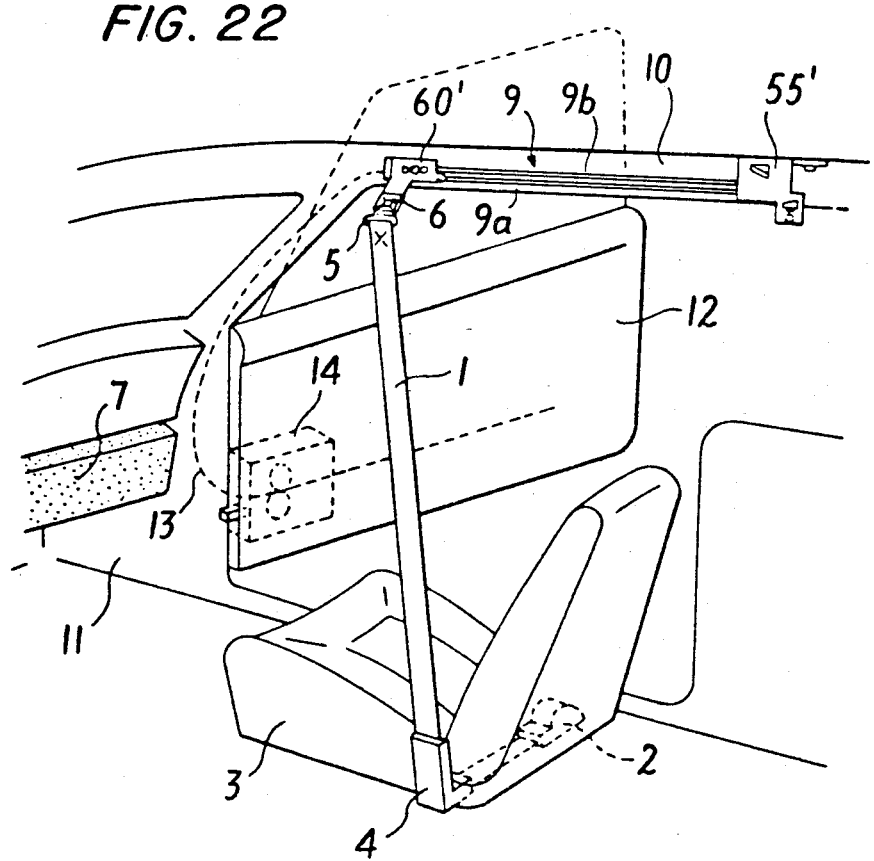
FIG. 22 is a pictorial view of a restraint belt system having a moving anchor of the type shown in greater detail in FIGS. 23–26.
Figure 23:
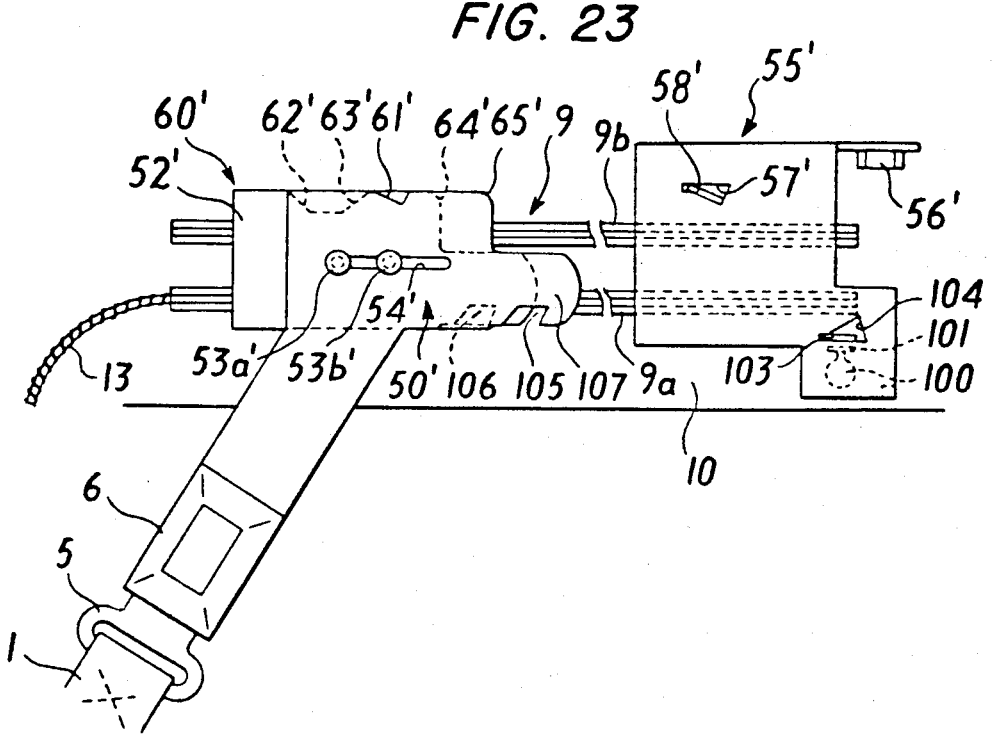
FIG. 23 is a side elevational view of the embodiment of FIGS. 22–27 in the release position.
Figure 25:
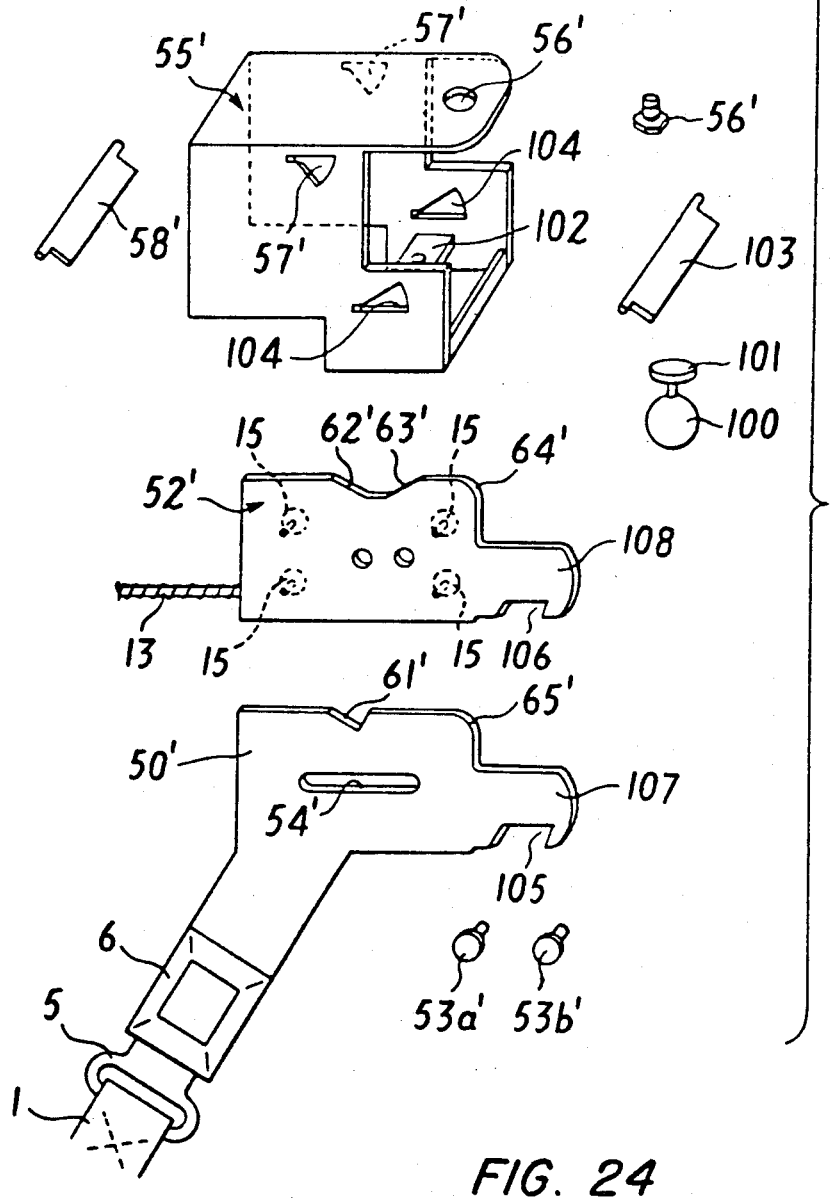
FIG. 25 is an exploded pictorial view of the system of FIGS. 22–27.
Figure 24:
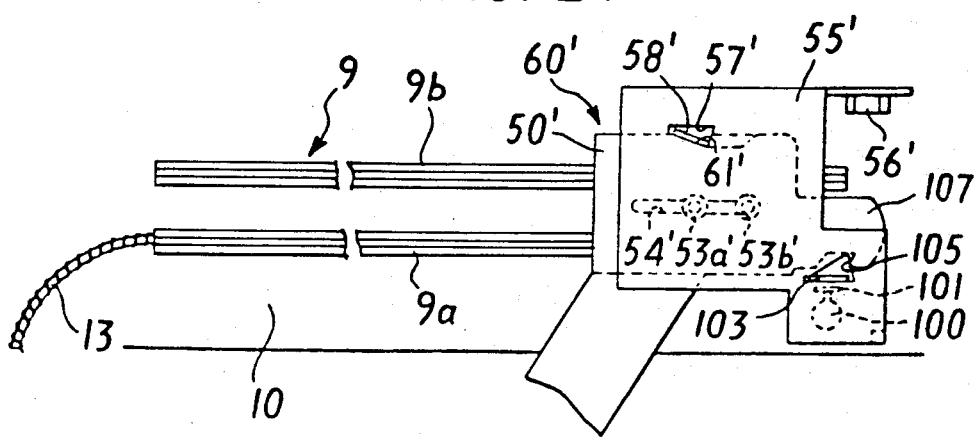
FIG. 24 is a side elevational view of this system in the restraint position.

When the door is open, and preferably when the door is anywhere between about half-way and fully opened (see U.S. patent application Ser. No. 950,020, filed Oct. 10, 1978, which is commonly owned herewith) the movable anchor assembly 60' has been pulled forwardly along the track 9 by the transfer wire 13, having been driven to that position by the motion amplifier 14 when the door was moved from closed to part-way open. In the release position, as shown in FIGS. 22 and 23, the belt 1 is held in the occupant-releasing configuration. When the door is moved toward the closed position, the transfer wire 13 pushes the cam member 52' rearwardly along the track 9. The lost motion coupling allows movement of the cam member 52' relative to the movable anchor member 50' up to the point when the rearward pin 53b' engages the rearward end of the slot 54' in the movable anchor 50'. Beginning at that point, the cam member and anchor member move together until, when the door is fully closed, the moving anchor assembly 60' moves to the restraint position (FIG. 24). In the restraint position the locking pawl 58' engages the locking shoulder of the notch 61' in the upper edge of the movable anchor member 50'. In the event of a collision or other emergency, the movable anchor is securely held against being pulled forward. Meanwhile, the emergency locking retractor 2 will respond to an abrupt change in velocity of the vehicle by locking the inboard end of the belt 1. Therefore, the passenger is restrained against being thrown forward or upward by the then fully locked shoulder belt 1. His lower body is protected by the shock-absorbing knee bolster 7.

In addition to being locked by engagement of the pawl 58' of the fixed anchor 55' with the locking shoulder 61' of the movable anchor 50', the embodiment of FIGS. 22-27 also includes an inertial-locking system which consists of a pendulum 100 supported by means of a cap portion 101 from a support bar 102 built into the fixed anchor 55' and a pawl 103 received in opposed, generally triangular slots 104 in the anchor 55'. The pendulum responds to an abrupt change in the velocity of the vehicle by rocking about the support member 102, thereby pivoting the pawl upwardly into a position in which it will engage locking shoulders 105 and 106 in the lower edges of rearwardly extending portions 107 and 108, respectively, of the anchor member 50' and the cam member 52' (see particularly FIG. 25). The operation of the inertial locking arrangement in response to an emergency situation better ensures that the movable anchor assembly 60' will be securely held in the restraint location. It is, in essence, a back-up system which will lock the movable anchor assembly at the restraint location even if there should be a malfunction of the normally locked anchor system (the pawl 58' in locking shoulder 61').

When the door is opened and the motion amplifier 14 responds by driving the transfer wire 13 in a direction pulling the cam member 60 forwardly, the lost motion coupling permits the release of the pawl 58' by allowing the cam member 52' to move forwardly relative to the anchor member 50' until the front pin 53a' engages the front end of the slot 54' in the movable anchor member 50' and to push the pawl 58' upwardly in the slots 57' by engagement between the cam surface 63' and the pawl. Meanwhile, the movable anchor member 50' remains stationary at the restraint location. After the lost motion ceases, both the cam member and the movable anchor member are pulled forwardly as a unit and are free to move forward to the release location.

Figure 28:
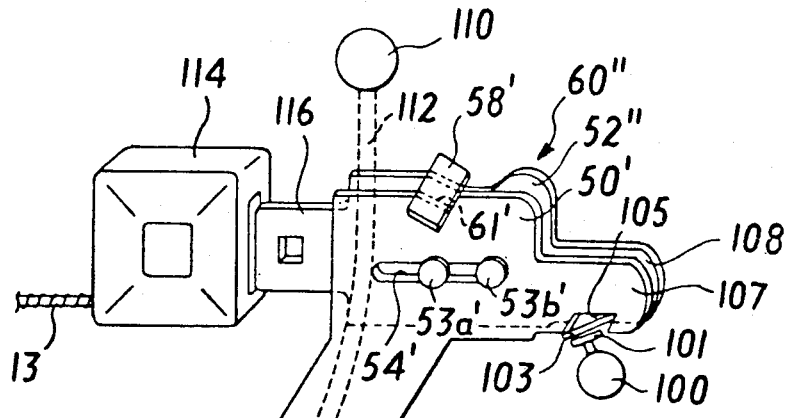
FIG. 28 is a pictorial view of the system of FIGS. 22–27 slightly modified.
Figure 27:
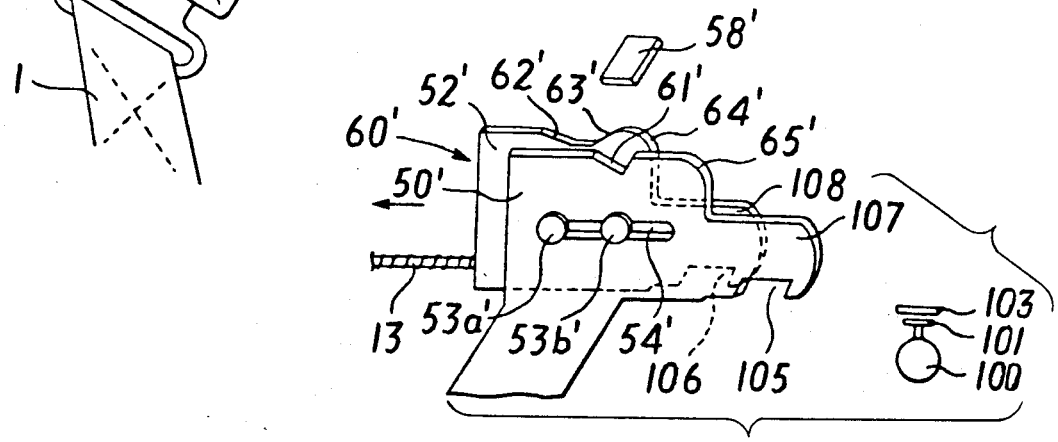
FIG. 27 is a pictorial view of the assembled system in the release configuration.
Figure 26:
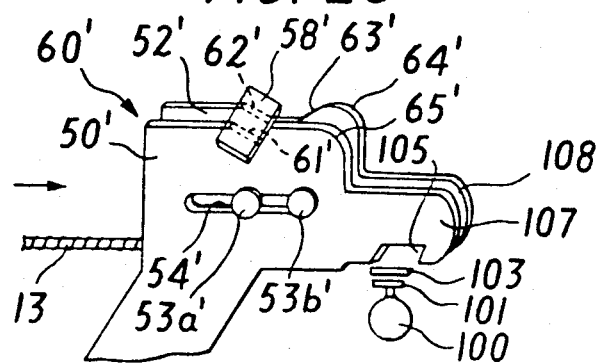
FIG. 26 is an assembled pictorial view of the system of FIGS. 22–27 in the restraint position.

FIG. 28 illustrates two modifications of the locking device of FIGS. 22 to 27. Firstly, an alarm 110 is connected by leads 112 to a switch or contacts in the buckle which close an electrical circuit to the alarm when the tongue 5 is detached from the buckle. Secondly, the transfer wire is connected to the cam member 52" by a releasable buckle 114 which accepts and latches onto a tongue portion 116 on the forward end of the cam member 52". The buckle 114 and tongue 116 allow the moving anchor assembly 60" to be released from the transfer wire 13, thereby permitting the moving anchor assembly to be manually moved to the locking position in the event that the motion amplifier 14 or some other part of the transfer mechanism fails to operate properly when the vehicle door is closed. Similarly, if the movable anchor assembly 60" should become locked at the restraint location, thereby preventing the door 12 from being opened due to the connection between the anchor system and the transfer system, the buckle 114 can be released from the movable anchor assembly, thereby allowing the door to be opened even though the moving anchor assembly remains in the restraint location. In that event the belt tongue 5 can be disconnected from the buckle 6 to release the restraint belt 1 so that the passenger can leave the vehicle.

Any of the inertia-responsive locking devices of the present invention may use the pendulum and pawl arrangement shown in FIGS. 29 through 32. In this arrangement the fixed anchor 120 comprises a frame 121 having an inverted U-shaped portion 122 at its upper end which accepts the end portion of a guide rail 123. A plate-like movable anchor member 124 slides smoothly along the guide rail 123 by means of sliders 125 received in opposed rail parts 9a and 9b defined by the curved edge flanges of the rail 123. A pendulum casing 126 is fastened by screws 127 to the lower portion of the frame 121 of the fixed anchor 120. A pendulum mounting plate 128 having a hole 129 supports a pendulum 130 by means of a cap portion 131. The upper surface of the cap portion 131 engages a downwardly projecting boss 133 on a pawl-actuating member 132 which has a generally U-shaped body, the legs 134 and 135 of which extend upwardly into engagement with a respective one of a pair of locking pawls 136 and 137. The member 132 is mounted on the pendulum housing by means of supports 138 and 139 which straddle it and have generally vertical guide slots 140 which receive pins 141 projecting laterally out from either side of the member 132.

The movable anchor member 124 has three locking shoulders 142 along the lower edge which are spaced apart from each other a distance that is less than the distance between the ends of the pawls 136 and 137. In the event that the position of the movable anchor member 124 should vary, which might occur due to wear, tolerance variations or other conditions or circumstances, the provision of two pawls and three shoulders provides better assurance than a single pawl and shoulder that the system will lock in the event of an emergency involving inertial response of the pendulum. In addition to improving the reliability of the inertial locking device the dual pawls and multiple locking shoulders make a passive belt system employing such an arrangement considerably more amenable to the usual allowable dimensionable tolerances in the assembly of the vehicle and the manufacture and installation of the passive system; the usual variations within tolerances that occur in the assembly of vehicles and components therefore makes it difficult to ensure that a system which is not adjustable or tolerant to variations will work properly.

More particularly, as shown in FIG. 30, an abrupt change in the velocity of the vehicle produces inertial motion of the pendulum 130, thereby causing the head portion 131 to pivot on the mounting plate 128 about a point at the edge of the cap. The pivoting lifts the center of the cap and pushes the pawl-actuating member 132 upwardly by a camming action between the upper face of the head portion 131 and the boss 133 of the actuating member 132. Both pawls 136 and 137 are pushed into a position to engage one of the locking shoulders 142 on the movable anchor member 124. Because of the difference between the spacing of the locking shoulders and the spacing of the tips of the pawls, the pawl closest to a shoulder engages that shoulder. With the relative positions of the parts shown in FIG. 30, the pawl to the left (136) has engaged the forward most locking shoulder 142. By comparing FIG. 30 and FIG. 31, in which the pawl 137 to the right has engaged the middle locking shoulder 142, the way in which the dual pawl and multiple shoulder arrangement operates can readily be understood.

FIGS. 33-35 show another dual pawl inertial locking system which includes certain similarities to the system shown in FIGS. 29-32. Accordingly, some of the components are marked with the same reference numerals used in FIGS. 29-32 but with prime suffixes added. In the system of FIGS. 33-35 there is no pawl-actuating member. Instead one pawl 150 has a dependent boss 151 which rests on the top of the cap 131' of the pendulum 130' and also has a boss 152 on top near its lower forward edge on which the rearward edge of a second pawl 153 rests. The pawl 150 is mounted in slots 154 in spaced side walls of the fixed anchor frame 121' which permit the pawl 150 not only to rock or pivot about the lower forward end but also to displace or translate upwardly.

In one mode of operation of the inertial locking system of FIGS. 33-35, as shown in FIG. 34, rocking of the pendulum 130' about a point at the perimeter of the head 131' engages the pawl 150 with the middle locking shoulder 142'. As in the case of the embodiment of FIGS. 29-32, the locking shoulders 142' are spaced more closely together than are the tips of the pawls 150 and 153 which engage them. With the relative position of the movable anchor 124' and fixed anchor 120' shown in FIG. 34, the pawl 150 is positioned to engage the center locking shoulder 142' while the other pawl 153 is blocked from such engagement. As shown in FIG. 35, should the movable anchor member 124' be located even more forwardly than the position shown in FIG. 35, the front pawl 153 will engage the front shoulder 142'. Those situations are very similar to those shown in FIGS. 34 and 35 except that the center and rearward locking shoulders 142' of the moving anchor member 124' are positioned for engagement by one or the other of the pawls 150 and 153, depending on the exact position of the movable anchor member 124'. It should be apparent that this situation also exists in the embodiment of FIGS. 29-32—there is a total of five possible locking conditions in each of the embodiments of FIGS. 29-35. A sixth locking mode—rear pawl to front shoulder—would be possible if the anchor member were designed not to interfer with the front pawl at a rearwardmost location.

The movable anchor member need not be precisely positioned with respect to the fixed anchor member to produce any of such locking configurations, and each pawl will be moved by the inertial actuating device (whether it is the pendulum alone or the pendulum acting through an intermediate actuating member) for engagement with one of the locking shoulders, even though a small forward movement of the movable anchor member 124 may be required before a full engagement between the tip of a pawl and a locking shoulder occurs. The embodiments of FIGS. 29-35 thus provide a range of locations over a relatively great distance in which locking of the movable anchor is ensured in the event of an abrupt change in velocity of the vehicle.

Figure 36:
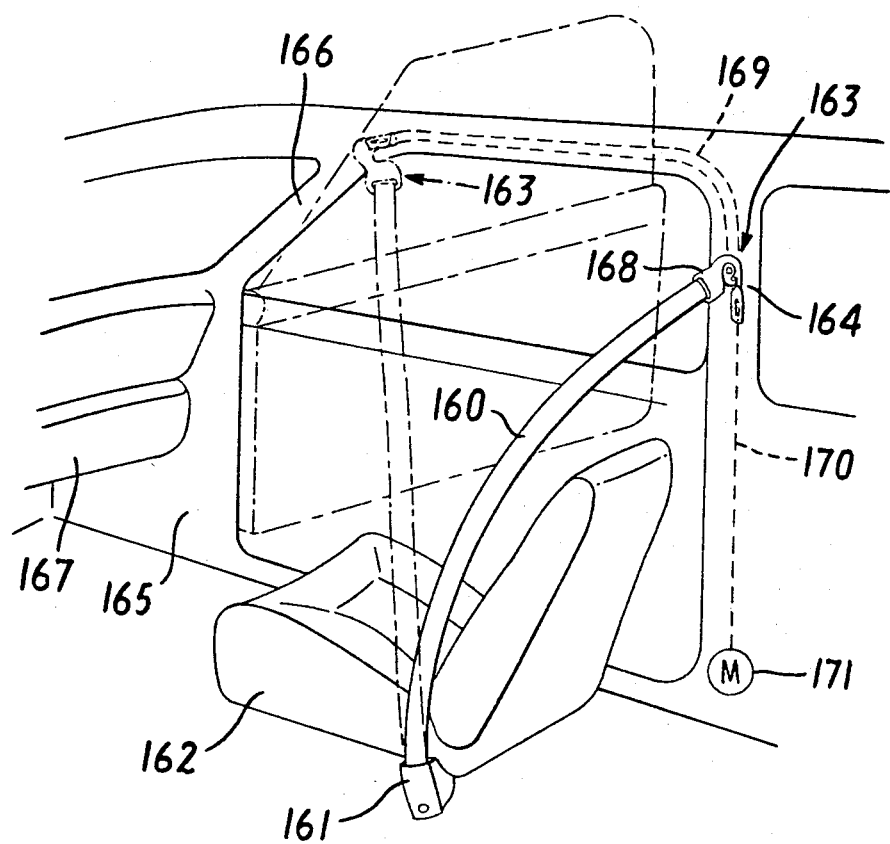
FIG. 36 is a pictorial view of a restraint belt system embodying another version of the invention.

FIG. 36 shows a passive restraint belt system which is generally similar to the embodiment of the overall system described above in that it includes a shoulder belt 160 which leads from a retractor 161 mounted at the lower rear portion of the inboard side of a vehicle seat 162 across the seat to a moving anchor system 163 which moves from a restraint location partway down the center post 164 of the vehicle body 165 upwardly along the post and then forwardly along the roof above the vehicle door to a release location (shown in phantom lines in FIG. 36) near the front post 166. The system also includes an energy absorbing knee bolster 167.

The lockable moving anchor system 163 comprises a movable anchor member 168 which is driven along a guide rail 169 that extends between the restraint location and the release location by a transfer drive wire 170 which, in turn, is driven by a drive unit 171 consisting of an electric motor and a reduction gear train. The motor and gear train unit 171 can be installed at any convenient location between the inner and outer panels below the rear window in a two-door automobile. Suitable control circuitry is provided in association with the motor to energize and de-energize it in forward and reverse modes, preferably in response to opening and closing motions of the door. When the door is closed, the shoulder belt 160 is anchored in the position shown in solid lines by the lockable movable anchor system. The retractor 161 is preferably of the emergency locking type which locks in response to an abrupt change in the vehicle speed, but otherwise allows the belt to be unwound to facilitate movement of the passenger.

When the door is opened the drive unit 171 is energized and drives the transfer wire 170, which in turn transfers the movable anchor member 168 along the track to the release position shown in the dot-dash lines. When the door is again reclosed the motor 171 is again energized, but in the reverse direction, to pull the movable anchor member back to the restraint position.

The lockable movable anchor system shown in FIG. 36 is shown in detail in FIGS. 37-39. The movable anchor member 168 is a plate-like element of a generally hook shape. A slider portion is received through a continuous slot 172 that extends along one wall of a tubular guide rail 169 which, by virtue of the slot, is generally C-shaped in cross section (see FIG. 39). The slider portion of the movable anchor member 168 that is received within the track 169 carries a pair of rollers 173 which roll along the guide rail; the longitudinally spaced-apart rollers 173 facilitate movement of the movable anchor member 168 around even relatively sharp corners. The upper outer end of shoulder belt 160 is passed through a slot 174 in the movable anchor member 168 and is secured to the incoming portion of the belt such as by stitching 175. The transfer wire 170, which is preferably a racked wire, is connected to a cam member 176 by a fitting 177. The cam member, in turn, is connected to the movable anchor member 168 by a lost motion coupling which consists of an elongated slot 178 in the cam member and a pin 179 which passes through a hole in the movable anchor member 168 and, conveniently and efficiently, also serves as an axle for one of the rollers 173. When the transfer wire is driven upwardly from the drive unit (see FIG. 36), thereby to drive the movable anchor 168 from the restraint location toward the release location, the cam member 176 moves upwardly until the rearward end of the slot 178 engages the pin 179. Thereafter, the cam member and movable anchor member move together along the track (see FIG. 37). When the transfer wire 170 is pulled down by the drive unit, the cam member 176 moves rearwardly until the forward end of the slot 178 engages the pin 179 (see FIG. 38, solid lines).

The lockable movable anchor system shown in FIGS. 37-39 further comprises a fixed anchor assembly 180 which comprises mounting member 181 of generally U-shape in cross section, the longer leg of which lies against a set-in portion 182 of a bracket or a frame member of the vehicle body and is fastened to the frame member of a lower bolt and nut 183 and a strong pin or stud 184 threaded to receive a nut 185. The stud 184 carries a pivotable locking pawl 186 which is generally U-shaped (when viewed from the front) having a pair of legs each of which has a hole to be received on the stud and a cross piece 187. The pawl 186 is spring-loaded by a leaf spring 188 to pivot in a direction that moves the cross piece 187 toward the track.

As the movable anchor assembly (i.e., the movable anchor member 168 and cam member 176 and associated elements) approaches the restraint location of the movable anchor assembly, a lower cam surface 189 on the cam member 176 engages the cross piece 187 of the pawl and pivots the pawl outwardly to allow the movable anchor member to move past the pawl. The movable anchor member has a notch 190 which defines locking shoulders positioned to be engaged by the cross portion 187 of the pawl 186 and prevent the movable anchor member from being moved in either direction away from the restraint location. Accordingly when the movable anchor assembly is pulled back to the restraint location by the transfer wire 170 the pawl 186 automatically snaps into the notch 190 and locks the anchor system by engagement of the spring-loaded pawl 186 with the locking shoulders on the movable anchor member 168.

When the transfer wire is again driven upwardly by the drive unit 171, the cam member 176 moves a distance equal to the length of the slot 178 while the anchor member 168 remains stationary because of the lost motion provided by the pin 179 and slot 178. During that initial motion of the transfer wire 170 and cam member 176, a second cam surface 191 on the cam member engages the cross piece 187 of the pawl 186 and pivots the pawl out into a release position out of engagement with the locking shoulders of the movable anchor member 168 and holds the locking pawl in the release position until after the then lower edge of the slot 178 in the cam member 176 has engaged the pin 179, at which point the cam member 176 and movable anchor member 168 begin to move together. Continued driving of the transfer wire 170 pushes the movable anchor assembly up along the post and then forwardly to the release location (phantom lines in FIG. 36).

The anchor member 168 has a large notch 192 which receives and embraces the stud 184 when the movable anchor member is in the restraint location (FIG. 38). Such engagement and the reception of the anchor member behind the outer leg of the pawl 186 and the outer flange on the fixed anchor 181 provides a strong attachment point for taking the forces exerted on the movable anchor in a crash or other emergency situation.

The embodiment shown in FIGS. 56-58 is very similar to that of FIGS. 37-39 and is, therefore, taken up at this point. The same reference numerals used in FIGS. 37-39, are applied to many of the components of the embodiment of FIGS. 56-58, but prime suffixes are added. The principal differences are as follows:

1. Instead of one pair of rollers 173, each roller being located on one side of the anchor member 168 (see FIGS. 37-39) there is a pair of tandem rollers 173', the rollers of each tandem arrangement being on opposite sides of the movable anchor member 168 and thus riding along the flange portions of the guide rail 169' on either side of the slot 172'.

2. When viewed from the front, the cam member 176' is generally U-shaped, so it has two leg portions which straddle the movable anchor member 168' (see FIG. 57).

3. The pawl 186', instead of being bifurcated (FIG. 39), is mounted by means of a single leg portion 186a' near the end of the mounting stud 184' and then turns at an offset portion 186b' toward the center post of the vehicle and terminates in a locking portion 186c' against which the leaf spring 188' bears.

The pair of tandem wheels provides for smoother running, and the other changes generally simplify and reduce the costs of fabrication and assembly of the device. Otherwise, the structure and mode of operation of the embodiment of FIGS. 56 to 58 are the same as those of the embodiment of FIGS. 37–39.

The releasable locking device shown in FIGS. 40–44 comprises a plate-like movable anchor member 200 which is of generally L-shape in profile and which has a hole 201 adapted to receive a bolt for pivotably attaching a belt D-ring 202 on the end of a belt 203. A slider portion 202a of the movable anchor member 200 is received within a generally C-shaped tubular guide rail 205, the guide rail having a continuous lengthwise slot 204 in one wall through which part of the movable anchor member protrudes. A generally U-shaped cam member 206 is coupled to a transfer wire 207. Laterally spaced-apart legs 206a and 206b which straddle the slider portion 202a of the movable anchor member 200 are connected to the movable anchor member 200 by a lost motion coupling which comprises a pin 208 on the anchor member which extends through and some distance out from either face of the slider portion 202a and correspondingly located elongated longitudinally extending slots 209a and 209b in the leg portions 206a and 206b of the cam member 206.

The end of a guide rail 205 is received telescopically within a generally U-shaped frame member 210 of a fixed anchor assembly 211. Each side wall of the frame 210 has an elongated slot 212 which is aligned substantially perpendicular to the axis of guide rail and receives a locking pin 213. The locking pin 213 is spring-loaded toward the rail axes by a spring 214 fastened to a cross piece 215 of the frame and is held in place axially by retaining rings 216.

Figure 40:
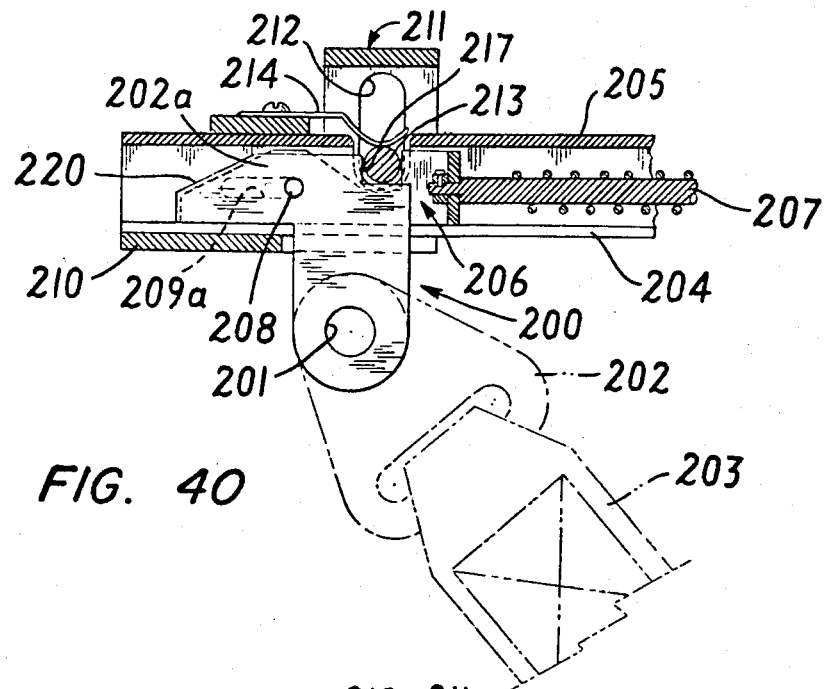
FIG. 40 is a side cross-sectional view of another embodiment of the invention in the anchored position.

When the transfer wire 207 moves the movable anchor member 200 and cam member 206 into the restraint location, as shown in FIG. 40 (such position being attained by movement of the transfer wire 207 to the left as viewed in FIG. 40) the locking pin 213 is pushed by the spring 214 into seated position in a notch in the front corner of the slider portion 202a of the movable anchor member which defines a locking shoulder 217. In that position the lost motion coupling has allowed the cam member 206 to move to the left relative to the anchor member, thus to locate a lock releasing cam surface 218a, 218b, on each leg portion 206a and 206b of the cam member 206 in a position displaced to the left (see FIG. 40) of the locking shoulder 217 on the anchor member 200. In attaining the locking position, caming surfaces 220 on the slider portion 202a of the cam member and caming surfaces 221a and 221b on each leg of the cam member push the locking pin upwardly in the slots 212 to permit the cam member and anchor member to move the left to the restraint location. The locking of the pin 213 against the locking shoulder 217 of the movable anchor member occurs automatically when the transfer wire 207 drives the movable anchor asssembly (the cam member and anchor member) to the restraint location.

When the transfer wire 207 is driven in a direction to move the movable anchor assembly from the restraint location to the release location (i.e., to the right as viewed in FIG. 41) the lost motion coupling allows the cam member 206 to move a short distance (equal to the lengths of the slots 209a and 209b in the cam member 206), thereby causing the cam surfaces 218a and 218b to push the locking pin 213 upwardly against the spring 214 and release the movable anchor assembly from the fixed anchor assembly. As soon as the trailing ends of the slots 209a and 209b engage the pin 202 (FIG. 41), the movable anchor member 200 and the cam member 206 move together away from the restraint location toward, and ultimately to, the release location. The release of the movable anchor assembly from the restraint location occurs automatically when the transfer wire 207 is driven in the releasing direction.

Figure 41:
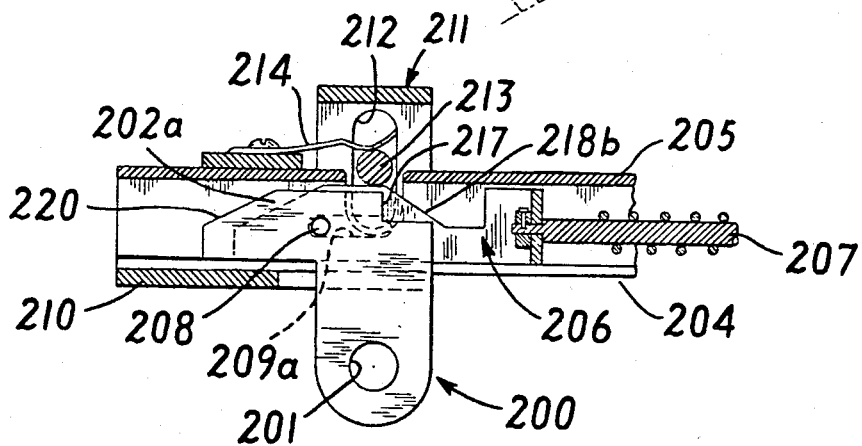
FIG. 41 is a side cross-sectional view the embodiment of FIG. 40 in a partially released configuration.
Figure 42:
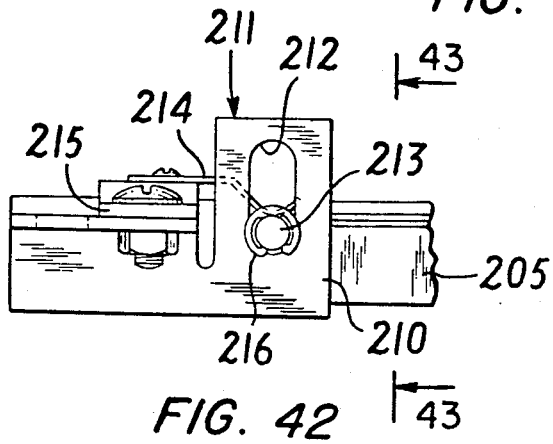
FIG. 42 is a side elevational view of the fixed anchor part of the system of FIGS. 40 and 41.
Figure 43:
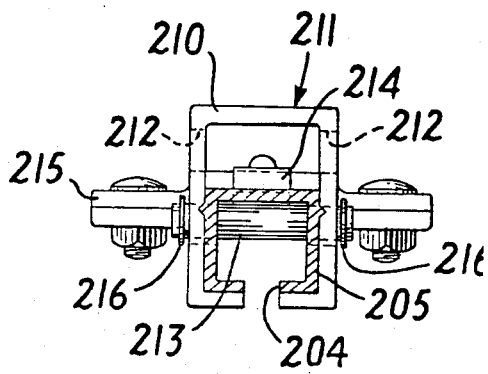
FIG. 43 is an end view of the fixed anchor shown in FIGS. 40-42.

As shown in FIGS. 40–41, an optional but desirable feature to be included in some of the belt transfer devices constructed according to the present invention is a low friction plastic sheath member 222 which facilitates sliding motion of the movable anchor assembly and also quiets the operation of the device not only during movement but when it is in stationary position by eliminating noise due to rattling when the vehicle moves over rough surfaces. The sheath 222 (best shown in FIG. 44) is a member of uniform wall thickness which matches the shape of the external surfaces of the cam member 206, and fits over the cam member (as is perfectly clear from FIG. 44).

FIG. 45 shows on variation in the construction of the lockable anchor device of FIGS. 40–44, namely, the reversal of the pin and slot of the lost motion coupling. The movable anchor member 200' has an elongated longitudinally extending slot 223, and the cam member 206' has a pin 224 which extends across the space between the leg portions. Another variation in the construction of the movable anchor assembly of FIGS. 40–45, as shown in FIG. 46, is the disposition of a movable anchor member 200" in generaly side-by-side and face-to-face relation with a cam member 206".

Another modification of the embodiment of FIGS. 40 to 44, as shown in FIGS. 47 and 48, involves reversing the direction from which the transfer wire 207 leads to the moving anchor assembly. The construction of the movable anchor member 200 and the fixed anchor assembly 211 are the same as those in FIGS. 40–44, and the cam member 225 is very similar to the cam member 206, in that it includes a pair of laterally spaced-apart leg portions 225a and 225b, each of which has a slot 226 in a corresponding position and forming part of a lost motion coupling between the cam member and the anchor member. Each leg of the cam member has a cam surface 227 which pushes the locking pin 213 upwardly to permit the anchor assembly to move to the restraint location and cam surfaces 228 for moving the pin 213 to the releasing position when the anchor is to be moved away from the restraint location. A lug 229 on the end of each leg portion 225a and 225b stops the anchor assembly from moving entirely past the restraint location (see FIG. 47). The operation of this embodiment is essentially the same as the embodiments of FIGS. 40–46 except that the anchor assembly moves to the restraint location by being *pulled* by the transfer wire 207 from right to left and moves from the restraint location to the release location by being *pushed* from left to right.

As shown in FIGS. 49–51, another embodiment of releasably locking movable anchor device comprises a plate-like movable anchor member 230 having a notch 231 which defines a pair of locking shoulders, a pin 232 which extends through it and some distance laterally out from each face, and a slot 233 for receiving a loop at the end of a restraint belt. A slider portion of the movable anchor member 230 is received within a guide rail 234 which is of generally C-shape in cross section (FIG. 50) and has a continuous slot 235 in one wall through which the remaining portion of the movable anchor 230 projects. The projecting portions of the pin 232 slide along the sections of the wall of the rail which has the slot 235. At the restraint location, the slotted wall of the guide rail bears against a relatively strong frame member 236, which is part of a fixed anchor assembly 237 and carries a major part of the force on the anchor when the belt is under tension at the restraint location (e.g., in an emergency) by way of force transmission through the pin 232 (see particularly FIG. 50).

A box-like portion 238 of the frame member 236 has a pair of aligned guide grooves 239 set into the internal surfaces of the side walls. The guide grooves loosely receive a locking pin 240 which, in the embodiment shown, normally resides, due to gravity, in the lower portion of the slots but which can also be spring loaded as in the embodiment of FIGS. 40-43. A fork-like cam member 241 having a pair of laterally spaced apart legs 241a and 241b is connected to the end of a transfer wire 207, straddles the movable anchor member 230 and is coupled to the movable anchor member by means of a lost motion coupling. The lost motion coupling consists of the pin 232 on the anchor member and a generally rectangular notch 242 in the lower edge of each leg of the cam member 241, the notches of the two legs being aligned and corresponding in the transverse direction. A cam surface 243 at the leading end (relative to movement toward the restraint location) of each leg of the cam member 241 pushes the locking pin 240 upwardly in the guide grooves 239 as the moving anchor assembly approaches the restraint location, and a cam surface 244 on the trailing end (same relative reference) of each leg of the cam member pushes the pin 240 upwardly to allow the movable anchor assembly to leave the restraint location.

From the foregoing descriptions of other embodiments of the invention, especially those shown in FIGS. 40-48, other details of the mode of operation, such as the lost motion arrangement, should be readily apparent. It should be observed, however, that the pin 232 on the movable cam member 230, not only functions as one component of a lost motion coupling between the cam member and the movable anchor member, but also performs a significant part of the function of a slider which bears against the wall portions of the guide rail on either side of the slot 235. Finally, the pin 232, which is strong and durable, bears against portions of the wall 236 of the fixed anchor member on either side of a slot 245 in the frame member 236 which accepts the anchor member 230. Like the embodiment of FIGS. 47 and 48, the embodiment of FIGS. 49-51 is pulled by the transfer wire 207 to the restraint location by moving the movable anchor assembly from right to left and pushes the movable anchor assembly from the restraint toward the release location by pushing it from left to right. The notch 231 provides shoulders which not only restrain the movable anchor from being pulled to the right away from the restraint location toward the release location but also limit or stop the movement of the movable anchor assembly to the left. It should be quite apparent that the movable anchor member 200 of the embodiment of FIGS. 47 and 48 could be modified to provide locking shoulders formed by notches for limiting motion in both directions when the locking pin is in place.

Figure 52:
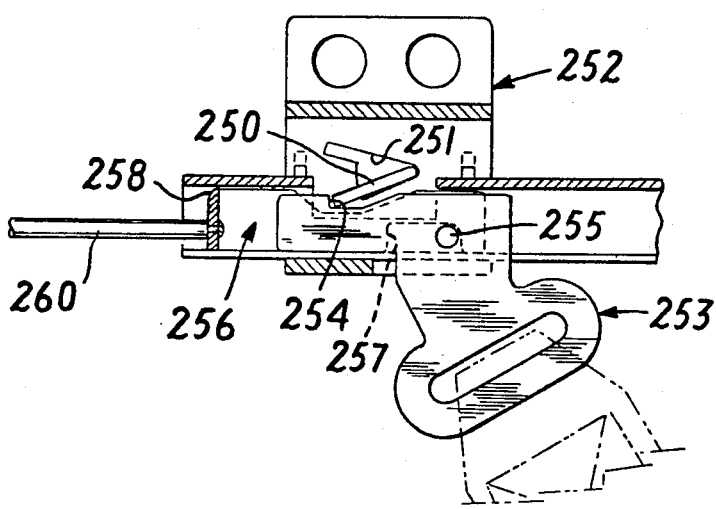
FIG. 52 is a side cross-sectional view of another embodiment of the invention.
Figure 53:
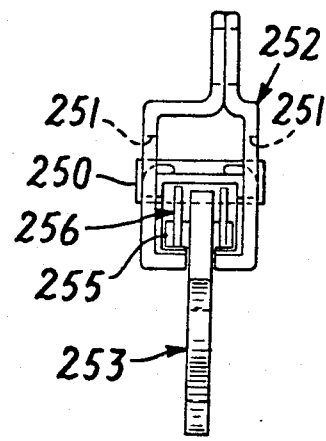
FIG. 53 is an end view of the embodiment shown in FIG. 52.
Figure 54:
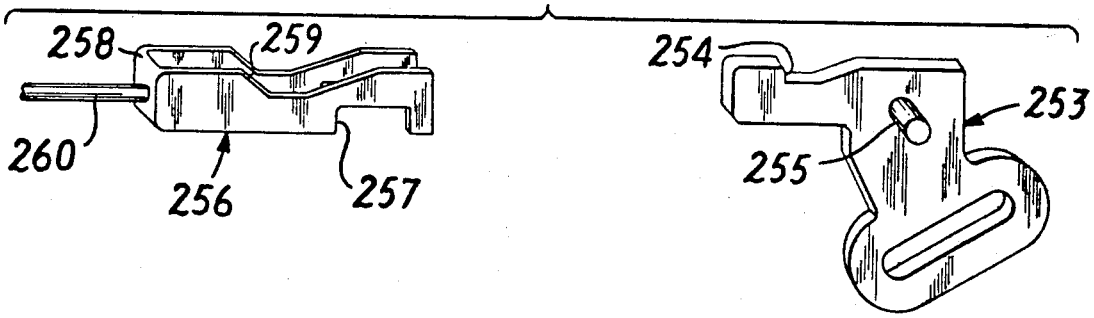
FIG. 54 is an exploded pictorial view of the FIGS. 52-54 embodiment.

The embodiment of the invention shown in FIGS. 52-54 is very similar in principle and in many aspects of construction to the embodiment of FIGS. 49-51. One difference, as should be quite apparent from an examination of the drawings, is the substitution of a locking pawl 250 for the locking pin. The locking pawl 250 is received within key-shaped holes 251 in the side portions of a frame 252. The movable anchor member 253 has a notch in the upper edge which defines a locking shoulder 254 positioned to be engaged by the pawl when the movable anchor assembly is in the restraint location (FIG. 52). A pin 255 provides one element of a lost motion coupling between the anchor member 253 and a cam member 256, each leg portion of which has a notch 257 in the lower edge which constitutes the other element of the lost motion coupling (see FIGS. 49-51 and the above description thereof). A slightly rounded corner 258 on the cross piece end of the cam member 256 pivots the pawl upwardly so that the movable anchor assembly can move into the restraint location—the rounding reduces wear. A cam surface 259, which is part of a notch in each leg of the cam member 256 pivots the locking pawl 250 out of engagement with the locking shoulder 254 of the movable anchor member 253 when the transfer wire 260 is pushed from left to right to move the movable anchor assembly from the restraint location (FIG. 52) toward the release location. The corresponding elements of the embodiment of FIGS. 52-54 and the additional details of the functions of the embodiment of FIGS. 52-54 should be readily apparent from the foregoing description of other embodiments of the invention and need not be described here.

Figure 55:
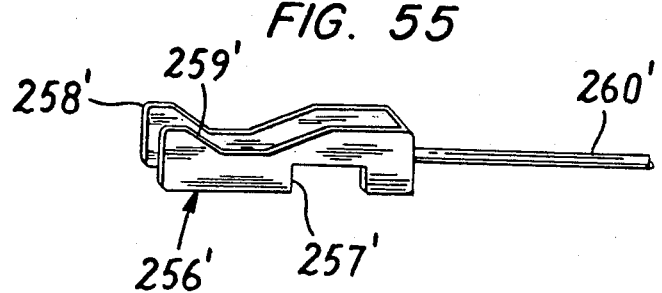
FIG. 55 shows a modified cam member useful to reverse the direction of operation of the embodiment of FIGS. 52-54.
Figure 63:
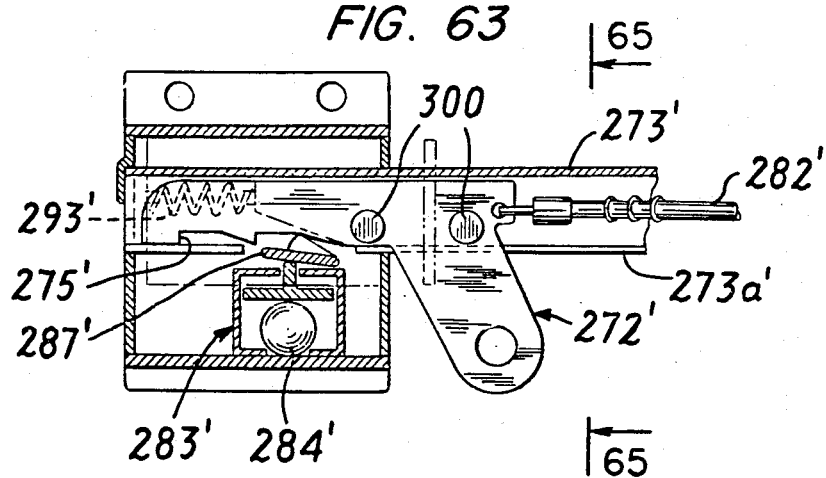
FIG. 63 is a side cross-sectional view of another embodiment.
Figure 64:
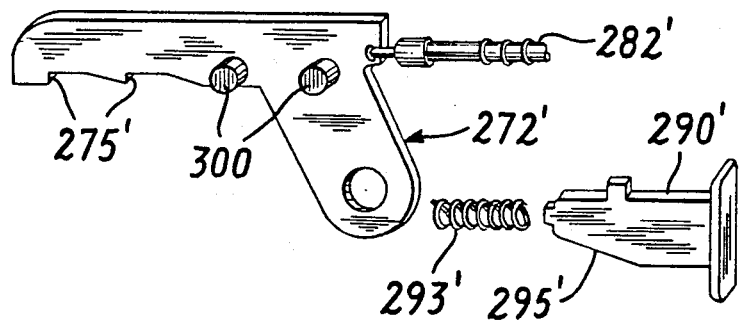
FIG. 64 is an exploded pictorial view of certain parts of the embodiment shown in FIG. 63.
Figure 65:
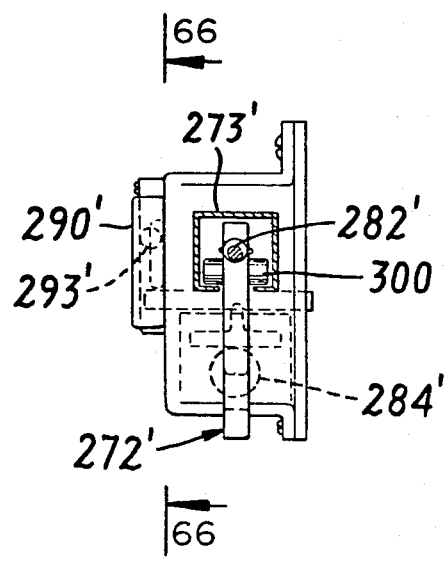
FIG. 65 is an end view in cross-section of the embodiment shown in FIG. 63 taken along the lines 65—65 of FIG. 63.
Figure 66:
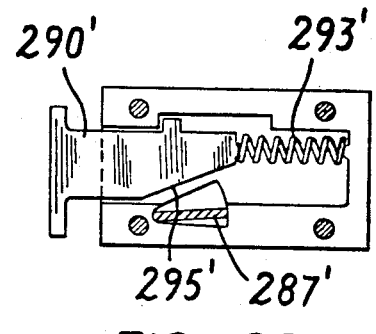
FIG. 66 is a cross-sectional view taken along the lines 66—66 of FIG. 65.
Figure 67:
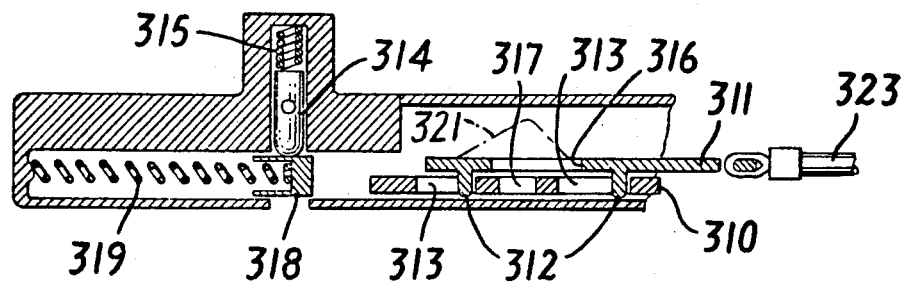
FIG. 67 is a top cross-sectional view of another embodiment of the invention.
Figure 68:
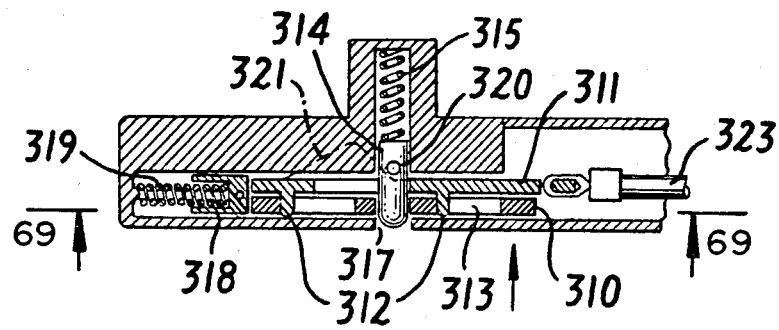
FIG. 68 is another top cross-sectional view of the embodiment of FIG. 67 in the anchored configuration (see the lines 68—68 of FIG. 69)
Figure 69:
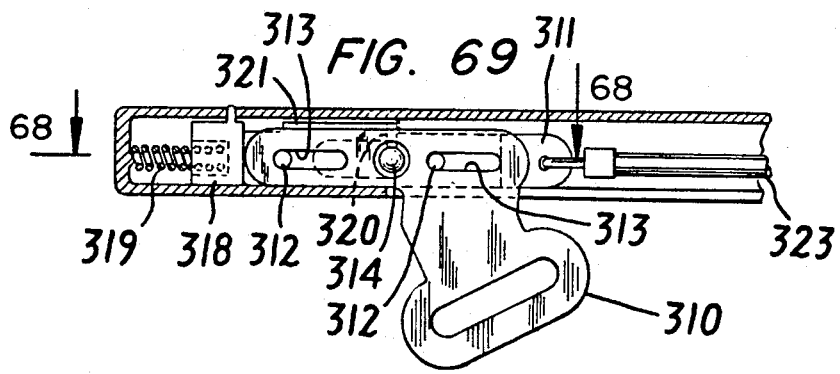
FIG. 69 is a side cross-sectional view of the embodiment of FIGS. 67 and 68 shown along the lines 69—69 of FIG. 68.
Figure 70:
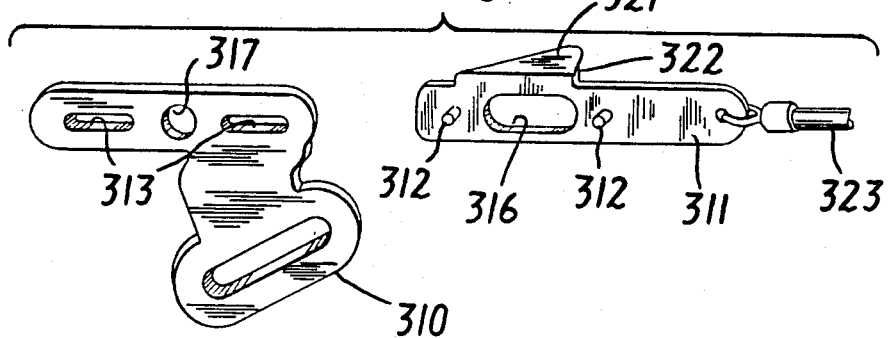
FIG. 70 is an exploded pictorial view of the movable anchor member and cam member of the embodiment of FIGS. 67-70.

FIG. 55 shows a modified cam member 256' which can be used with the other elements of the embodiment of FIGS. 52-54 in connection with a system in which a transfer wire 26' *pushes* the moving anchor assembly from the release location to the restraint location (movement from right to left in FIG. 55) and *pulls* the movable anchor assembly from the restraint location for the release location (left to right in FIG. 55). One can readily imagine from at study of FIGS. 52 to 55 the assembled relationship of the cam member 254' in the embodiment of FIGS. 52-54 and understand the mode of operation of the modified assembly.

The embodiment shown in FIGS. 59-62 of the accompanying drawings comprises a fixed anchor assembly 270 and a movble anchor assembly 271. The movable anchor assembly includes a plate-like cam member 272 having a portion received within a guide rail 273 and having a notch in the upper longitudinal edge defining a locking shoulder 274 and two notches in the lower edge defining two more locking shoulders 275. A hole 276 in a projecting portion of the movable anchor is adapted to receive a bolt or other fastener to secure a belt to the movable anchor member. A cam member 277 is coupled to the movable anchor member 272 by means of a lost motion coupling constituted by a longitudinal, elongated slot 278 in the cam member and a pair of pins 279 on the anchor member. A cam surface 280 along a portion of a notch cut into the cam member engages a locking pawl 281 of the fixed anchor assembly when the transfer wire 282 is pulled from left to right (as shown in FIG. 59) to release the pawl from locking engagement with the shoulder 274 on the movable anchor member.

An inertial locking device, which is part of the fixed anchor assembly, locks the movable anchor in the restraint location (FIG. 59) in response to an abrupt change in the velocity of the vehicle. The inertial locking device 283 comprises a ball 284 which normally rests in a depression in the bottom of a casing 285 but rolls out of the depression due to inertial upon an abrupt change in velocity, thereby pushing a pawl actuating member 286 upwardly to move a locking pawl 287 into a position where it will engage one of the locking shoulders 275 on the movable anchor member.

A manual release mechanism comprises a manually movable slider 290 which slides longitudinally within a guideway 291 in a portion 292 of the housing of the fixed anchor assembly. A spring 293 urges the slider 290 into an inactive position (FIG. 62). Portions of each of the pawls 281 and 287 extend across the guideway 291 and are engaged by caming surfaces 294 and 295, respectively, when the slider 290 is pushed in (right to left, FIG. 62) against the spring 293, thereby releasing both pawls from engagement with the locking shoulders with which they may be engaged with the movable anchor assembly is at the restraint location. The manual release device is a desirable feature to which permits the movable anchor to be released in the event of a malfunction of the locking system or if the vehicle should be parked on a slope that is steep enough to activate the inertial locking device, or if the vehicle stops with the inertial device locked.

The embodiment illustrated in FIGS. 63–66 is similar in many respects to the embodiment of FIGS. 59–62. Therefore corresponding components have been identified by the same reference numerals as used in FIGS. 59–62, but with prime suffixes. The principal differences between the embodiments are as follows:

1. The systems has only an inertial locking mechanism 283′ for locking the movable anchor member 272′ at the restraint location; the upper pawl and the cam member are omitted, and the transfer wire 282′ is coupled directly to the movable anchor member 272′.

2. The movable anchor member 272′ is guided along the guide rail 273′ by means of a pair of pins 300, each of which rides along the walls of the guide rail along either side of the slot 273a′.

3. The manual release slider 290′ has only a single caming surface 295′ positioned to engage the locking pawl 287′ of the inertial locking mechanism 283′.

In operation the transfer wire 282′ moves the movable anchor member 272′ directly (without any lost motion) between the release and restraint location. When the anchor member 272′ is at the restraint location (FIG. 63) it is positioned for locking in response to activation of the inertial locking device 283′ in a manner similar to the other embodiments having such mechanisms which are described above.

Referring to FIGS. 67–70, a movable anchor member 310 is coupled to a cam member 311 by a lost motion coupling which consists of a pair of pins 312 on the cam member and a pair of longitudinal elongated slots 313 on the anchor member. The fixed anchor assembly includes an axially movable pin 314 which is urged by a spring 315 in a direction to pass through an elongated slot 316 in the cam member and a locking hole 317 in the anchor member 310. When the movable anchor assembly is away from the restraint location a blocking plug 318 is pushed by a spring 319 into a position (see FIG. 67) in which the pin 314 is held in a retracted position. When the movable anchor assembly is pushed from right to left and enters the fixed anchor, the blocking member 318 is pushed against the force of the spring away from the blocking position. Meanwhile the surface of the cam member keeps the pin from being pushed out by the spring 315 until the movable anchor assembly is fully seated in the restraint location, at which point the pin 314 is pushed out by the spring 315 through the holes 316 and 317.

A cam follower pin 320 extends radially up from the locking pin 314. A flange portion 321 extending laterally from the cam member has a camming surface 322 which engages the follower pin 320 when the transfer wire 323 pulls the cam member from left to right (as viewed in FIGS. 67–69). The cam follower pin 320 tracks along the cam surface 322, and the locking pin 314 is thereby pushed back into the socket in the fixed anchor frame and housing against the spring 315, thereby releasing the pin from locking engagement in the hole 316 in the movable anchor member 310. Meanwhile the movable anchor member remains stationary at the restraint location until after the locking pin has been disengaged from the movable anchor by virtue of the lost motion coupling between the movable anchor member and the cam member.

The above-described embodiments of the invention are merely exemplary, and numerous variations and modifications will be readily apparent to those skilled in the art without departing from the spirit and scope of the invention. All such variations and modifications are intended to be included within the scope of the invention as defined in the appended claims.

I claim:

1. In a passive vehicle occupant restraint belt system having a restraint belt which can be shifted between an occupant-restraining configuration and an occupant-releasing configuration by movement of a portion thereof along a path defined by a guide rail affixed in the vehicle, the improvement comprising a movable anchor member received for movement along the rail and adapted to receive said belt portion, an anchor transfer element coupled to the movable anchor member to move it along the rail, a fixed anchor member at a restraint location along the guide rail corresponding to the occupant-restraining configuration of the belt, and locking means for selectively locking the movable anchor member to the fixed anchor member so that the belt is anchored in the occupant-restraining configuration and for releasing the movable anchor member from the fixed anchor member so that it can be moved along the guide rail by the transfer element to transfer the belt to the occupant-restraining configuration, wherein the locking means comprises a shoulder on one of the anchor members and an inertia device on the other anchor member which includes an inertial mass adapted to detect a rapid change in velocity and move in response thereto and a locking member movable by the mass into locking engagement with the shoulder on said one anchor member.

2. The improvement claimed in claim 1 wherein the shoulder is on the fixed anchor member, and the inertia device is on the movable anchor member.

3. The improvement claimed in claim 1 wherein the shoulder is on the movable anchor member and the inertia device is on the fixed anchor member.

4. The improvement claimed in claim 3 wherein there are at least two shoulders on the movable anchor member to better ensure locking of the anchor members upon movement of the inertial mass.

5. The improvement claimed in claim 4 wherein there are also two locking members actuated by the same mass upon movement thereof.

6. The improvement claimed in claim 5 wherein the locking members are pawls, and the inertia device further includes a movable pawl-operating element having portions engageable with the inertial mass and with both pawls to move the pawls into positions for engagement with the shoulders on the anchor member upon movement of the inertial mass.

7. The improvement claimed in claim 5 wherein the locking members are pawls, wherein the inertial mass engages an actuating element upon movement thereof, which moves the pawl into a position for engagement with a shoulder on the anchor member, and wherein the other pawl engages the one pawl and is moved by the one pawl into a position for engagement by another shoulder on the anchor member when the one pawl is moved by the actuating element to a position not favorable for engagement by a shoulder on the anchor member.

8. In a passive vehicle occupant restraint belt system having a restraint belt which can be shifted between an occupant-restraining configuration and an occupant-releasing configuration by movement of a portion thereof along a path defined by a guide rail affixed in the vehicle, the improvement comprising a movable anchor member received for movement along the rail and adapted to receive said belt portion, an anchor transfer element coupled to the movable anchor member to move it along the rail, a fixed anchor member at a restraint locating along the guide rail corresponding to the occupant-restraining configuration of the belt, and locking means for selectively locking the movable anchor member to the fixed anchor member so that the belt is anchored in the occupant-restraining configuration and for releasing the movable anchor member from the fixed anchor member so that it can be moved along the guide rail by the transfer element to transfer the belt to the occupant-releasing configuration, and further comprising a second locking means for locking the movable anchor member to the fixed anchor member in response to a rapid change in velocity of the vehicle while normally releasing the movable anchor member so that it can be moved along the guide rail, the second locking means including a shoulder on one of the anchor members and an inertia device on the other anchor member, including an inertial mass mounted to move in response to a rapid change in velocity and a locking member movable by the mass into locking engagement with the shoulder on said one anchor member.

9. A latch device mountable within a vehicle for holding securely a tongue portion attached to the end portion of a seat belt unwound from a retractor secured to the vehicle; said latch device including a latch portion adapted to receive said tongue portion for holding it securely in place; release means operable by the seat occupant for releasing said tongue portion from said latch portion; and inertia sensing means associated with said latch portion for holding said tongue portion therewithin in response to a predetermined variation in the speed of the vehicle even if said release means should be operated.

10. A device according to claim 9, said latch portion including a housing adapted to receive said tongue portion, and said inertia sensing means being attached to said housing.

11. A device according to claim 9, said release means being operable upon opening of the vehicle door whereby said inertia sensing means can serve to hold said tongue portion within said latch means if said door should inadvertently be opened during an accident involving the vehicle.

12. In a passive vehicle occupant restraint belt system having a restraint belt which is moved between an occupant-restraining configuration and an occupant-releasing configuration, the improvement comprising a pair of parallel, laterally spaced-apart elongated guide rails extending between release and restraint locations in the vehicle corresponding to the releasing and restraining configurations of the belt, a movable anchor member attached to the belt and mounted to move along the guide rails by two pairs of spaced-apart slides, one pair received in each rail, means for moving the movable anchor member along the rail between said locations, a fixed anchor member affixed to the vehicle at the restraint location, and locking means for releasably locking the movable anchor member to the fixed anchor member, wherein the locking means includes a shoulder on one of the anchor members, a pawl on the other anchor member which is normally retracted from the shoulder when the movable anchor member is at the restraint location, and inertia-responsive means for moving the pawl into a position to be engaged by the shoulder upon a rapid change in the velocity of the vehicle.

* * * * *